US006198545B1

(12) United States Patent
Ostromoukhov et al.

(10) Patent No.: US 6,198,545 B1
(45) Date of Patent: Mar. 6, 2001

(54) METHOD AND APPARATUS FOR GENERATING HALFTONE IMAGES BY EVOLUTIONARY SCREEN DOT CONTOURS

(76) Inventors: Victor Ostromoukhov, Av. Jolimont 7, CH - 1005 Lausanne; Roger D. Hersch, Ch. des Planches 39, CH - 1066 Epalinges, both of (CH)

( * ) Notice: Subject to any disclaimer, the term of this patent is extended or adjusted under 35 U.S.C. 154(b) by 0 days.

(21) Appl. No.: 08/410,767

(22) Filed: Mar. 27, 1995

(30) Foreign Application Priority Data

Mar. 30, 1994 (CH) .................................................. 00947/94

(51) Int. Cl.[7] ...................................................... H04N 1/40
(52) U.S. Cl. .......................... 358/459; 358/456; 358/298; 382/254
(58) Field of Search ..................................... 358/456, 459, 358/458, 454, 448, 428, 429, 298, 534, 536, 540, 450; 382/254, 268, 269, 266

(56) References Cited

U.S. PATENT DOCUMENTS

| 4,972,329 | * | 11/1990 | Breger ................................... | 395/117 |
| 5,138,673 | * | 8/1992 | Yoshida ................................ | 382/238 |
| 5,155,598 | * | 10/1992 | Ramekers et al. .................... | 358/459 |
| 5,172,132 | * | 12/1992 | Haneda et al. ....................... | 358/296 |
| 5,309,246 | * | 5/1994 | Barry et al. .......................... | 358/459 |
| 5,410,414 | * | 4/1995 | Curry .................................... | 358/298 |
| 5,446,558 | * | 8/1995 | Hamilton, Jr. ....................... | 358/459 |

* cited by examiner

*Primary Examiner*—Edward L. Coles, Sr.
*Assistant Examiner*—Madeleine AV Nguyen

(57) ABSTRACT

The present invention is related to the synthesis, display and printing of halftone images. The invention comprises a method capable of generating screen elements with sophisticated screen dot shapes such as artistic shapes, microletters and ideograms. The method can be used to generate screen elements whose screen dots are made of evolving artistic shapes at increasing intensity level. For generating screen elements at consecutive intensity levels, intermediate contours which bound the white and black parts of each screen element are obtained by interpolating between fixed predefined contours. Such interpolated contours defining screen dots may be transformed from a screen dot definition space to a screen dot rendition space before being converted into discrete screen elements by a scan conversion and filling operation. Since the method allows producing large screen elements made up of many distinct subscreen dot shapes, the process can be used to generate discrete subscreen elements whose geometry may vary from one subscreen dot to another for the same intensity level. Some subscreen dot shape variations may be used to avoid counterfeiting by photocopying machines and digital scanners. The contours which make up the screen elements' dot shapes may be of arbitrary complexity. This characteristic makes the invented process useful in fields where halftoning with sophisticated screen dot shapes is desired, i.e. for printing banknotes, postage stamps or valuable papers. Screen dot shapes made of latin, greek cyrillic or arabic typographic characters as well as screen dot shapes made of ideograms offer new design freedom for creating posters and graphic designs.

21 Claims, 24 Drawing Sheets

METHOD AND APPARATUS FOR GENERATING HALFTONE IMAGES BY EVOLUTIONARY SCREEN DOT CONTOURS.

FIGURES.

SCAN-CONVERSION AND FILLING

SCAN-CONVERSION AND FILLING

TRANSFORMATION $t_1$

TRANSFORMATION $t_2$

METHOD AND APPARATUS FOR GENERATING HALFTONE IMAGES BY EVOLUTIONARY SCREEN DOT CONTOURS

DESCRIPTION

Background of the Invention

The disclosed invention relates to a method and apparatus for synthesizing, displaying and printing colour or black/white halftone images. Such images can be reproduced for example on displays, paper, film or on other matter such as cloth. Apparatuses used for reproducing such images comprise display, printing and latent image transfer devices. Examples of such devices are printers, phototypesetters or computer driven displays.

The case of color image reproduction can be reduced to the case of black/white image reproduction if the color image is considered to be separated into three color planes (red-blue-green or cyan-magenta-yellow) or into four color planes (cyan-magenta-yellow-black), each color plane being treated as though it were a black/white halftone image. Therefore, the present disclosure will mainly relate to black/white halftone images; the color extension is implicit. When the term grayscale pixel or grayscale image is used, a variable intensity pixel or variable intensity image is meant. Therefore, the terms variable intensity and grayscale can be freely interchanged throughout the description and the claims.

In the graphics industry, the most common method for reproducing halftone images using bilevel printing devices is the ordered dither method. This method consists in subdividing the whole output image space into repetitive adjoining areas—screen elements. The inside of each screen element is gradually blackened by screen dots of increasing surface according to the gray level of the original image, thus ensuring the presence of various gray levels in the reproduction.

The terminology used in the description uses (a) the term input or source image for the variable intensity image to be reproduced, (b) the term screen element to describe a single possibly repetitive screen element containing both the white and the black screen element parts, (c) the term discrete screen element to describe a rasterized screen element composed of a set of elementary screen element cells or screen element pixels, (d) the term output halftone image to describe a bitmap or pixmap containing the output halftone image and (e) the terms output pixel space or output image pixel plane to specify the space or plane containing the output halftone image. Both the terms intermediate contour and interpolated contour have the same meaning, i.e. a contour whose generation comprises an interpolation between fixed predefined contours. The scan-conversion and filling of continuous contour shapes in order to obtain discrete shapes in pixel plane memory (bitmaps or pixmaps) is also called "rasterization".

In the description which follows, large screen elements are considered which may be subdivided into adjoining subscreen elements, the subscreen elements containing subscreen dots. It is also possible to define a plurality of subscreen dots within a large screen element without requiring that the screen element be subdivided into subscreen elements.

In mosts parts of the description, for the sake of simplicity, we assume that intensity level 0 corresponds to white and a that a certain maximal intensity level, for example 1, corresponds to black. People knowledgeable in the art may easily convert this intensity definition to the other definition, where intensity level 0 represents black and a certain maximal intensity level, for example 1, represents white.

Methods for generating screen elements used in industry are generally based on dither threshold matrices. Such dither threshold matrices can be created manually or generated by an algorithmic process. One example of a dither threshold matrix is Bayer's dither threshold matrix, well-known in the graphics art industry [Bayer73]. Dither threshold matrices can be generated automatically from given analytical spot functions [Fink92], by sampling and discretizing the spot function at uniform intervals in both the horizontal and the vertical directions.

When generating screen elements from dither threshold matrices obtained for example by the discretization of an analytical spot function or by some other means, the dither matrix thresholds represent a discrete threshold function which is explicitely defined as a function of the coordinates of each elementary screen element cell. Although relatively flexible, dither matrix based methods only offer limited possibilities when generating sophisticated screen dot shapes, due to the fact that all screen dot shapes generated at different intensity levels need to be imbricated into one another.

We therefore propose a new method based on evolutionary screen dot contours for generating sophisticated screen dot shapes which offers more freedom due to the fact that the generated screen dot shapes at different intensity levels need not be imbricated into one another.

SUMMARY OF THE INVENTION

The disclosed method differs from previously known methods by the fact that, contrarily to methods based on dither threshold matrices, it does not make use of dither thresholds. It is characterized by the fact that intermediate contours bounding the white and black parts of each screen element are obtained by interpolating between fixed predefined contours, by the fact that the intermediate contours are transformed from a screen dot definition space to a screen dot rendition space and by the fact that the desired discrete screen elements are obtained by scan-converting and filling the intermediate transformed contours in the screen dot rendition space. The so obtained discrete screen elements are laid out in adjoining areas so as to pave the output image pixel space.

Alternately, fixed predefined contours can be transformed from the screen dot definition space into the screen dot rendition space and then be interpolated so as to obtain intermediate contours in the screen dot rendition space.

The disclosed method may be used beyond its simple application for generating screen dots with evolutionary screen dot contours. Since this method can produce large screen elements made up of a plurality of adjoining subscreen elements or made of a plurality of distinct subscreen dots, it therefore becomes possible to produce screen elements with a well-defined orientation, i.e. an angle close to a non rational angle. This method can also produce subscreen dots whose shape, period and orientation vary according to their position within the screen element, by choosing an appropriate transformation function between the screen dot definition space and the screen dot rendition space. These variations are useful for preventing unauthorized reproduction of images generated in this manner. The reproduction of small screen dots and large screen dots does not induce the same dot gain. Therefore, when the original image is printed onto the target printing device, this dot gain variation is compensated for by dot gain compensation factors (gamma correction) which take into account the size of the current screen dot. During optical reproduction (photocopying) this variation cannot be compensated for and produces variations in light intensity which depend on the size of the subscreen elements or respectively the size of the subscreen dots. Moreover, the fact that the shape and the period of the subscreen element, respectively subscreen dots vary prevents faithful reproduction by a digital scanning device (scanner). Using a scanner to scan and digitize an image with variable sized subscreen elements, respectively subscreen dots at a scanning frequency close to some of the subscreen element, respectively subscreen dot frequencies produces very visible moiré effects, thus making faithful reproduction almost impossible.

The invented method differs from existing methods for generating evolutionary screen dot shapes using dither matrices in that successive screen dot shapes corresponding to increasing intensity levels do not need to be imbricated or embeddable within one another, as is the case for screen elements produced using dither matrices. This property is essential when generating complex screen shapes whose shapes evolve, for example, by small rotations at increasing intensity levels. It also differs from existing methods used to generate evolutionary screen dot shapes in that a screen element may have as great a period as desired and that the screen element may be produced simultaneously, piece by piece, with the rendition of the output halftone image (on the fly halftoning).

While the output image is being generated, each input image pixel whose gray level equals g determines a rectangular area in the output image space which will be white, partially black or completely black depending on the input image pixel's intensity level. At output image rendition time, the portion of the discrete screen element associated with gray level g and determined by the area covered by the input image pixel is transferred to the corresponding rectangular area in the output image pixel space.

When dealing with simply shaped screen elements, the disclosed method offers as many possibilities as state of the art ordered dither halftoning methods. For screen elements presenting sophisticated shape variations, the disclosed method is flexible enough to produce 1) screen elements whose shape is of arbitrary complexity and 2) subscreen elements or subscreen dots whose period and area vary according to the position of the screen element, respectively subscreen dot within the image.

The fixed predefined contours used for generating screen elements may be drafted using contour drafting software. This characteristic makes the disclosed method extremely efficient in fields where halftoning with sophisiticated shapes is required, e.g. when printing banknotes, postage stamps or valuable papers and where protection against forgery must be ensured.

The invented method can be also applied to generate microletters such as the ones printed on bank notes, or to create posters which, when looked at from nearby, show artistic or typographic screen dot shapes and, when looked at from further away, show a reproduced halftone image. The invented method can further be used to generate screen elements made of ideograms.

BRIEF DESCRIPTION OF THE DRAWINGS

The characteristics and advantages of the invention will become obvious during the following detailed description whose embodiment is given as an example and refers to the attached figures, in which.

All figures representing screen elements, subscreen elements or halftone images are greatly enlarged. At high resolution, screen elements may be of a very small size (side length between 1/100 mm and 10 mm).

DETAILED DESCRIPTION

The disclosed method is characterized by the fact that the intermediate contours which bound the white and black parts of each screen element are obtained by interpolating between fixed predefined contours in such a way that either the intermediate contours obtained by interpolation or the fixed predefined contours are transformed from a screen dot definition space to a screen dot rendition space, and in such a way that the desired discrete screen elements are obtained by scan-converting and filling the intermediate contours within the screen dot rendition space.

The method enables screen elements to be generated which are as large as desired. Large screen elements can incorporate several subscreen elements, respectively subscreen dots. The evolution of screen dots at increasing intensity levels is given by their fixed predefined contours described in the screen dot definition space. The transformation of contours from a screen dot definition space to a screen dot rendition space may be a non linear transformation which creates in the screen dot rendition space subscreen elements, respectively subscreen dots whose periods, areas and geometry vary according to their position. It is well-known that dot gain effects due to reproduction on a target printing device must be compensated for (gamma correction) so as to ensure a well-spread out grayscale. Since the disclosed method may produce subscreen dots of varying areas for a single gray level, according to their position within the image, dot gain compensation is a multi variable function which depends on the desired gray level as well as on the area of the subscreen element under consideration.

Figure 13:
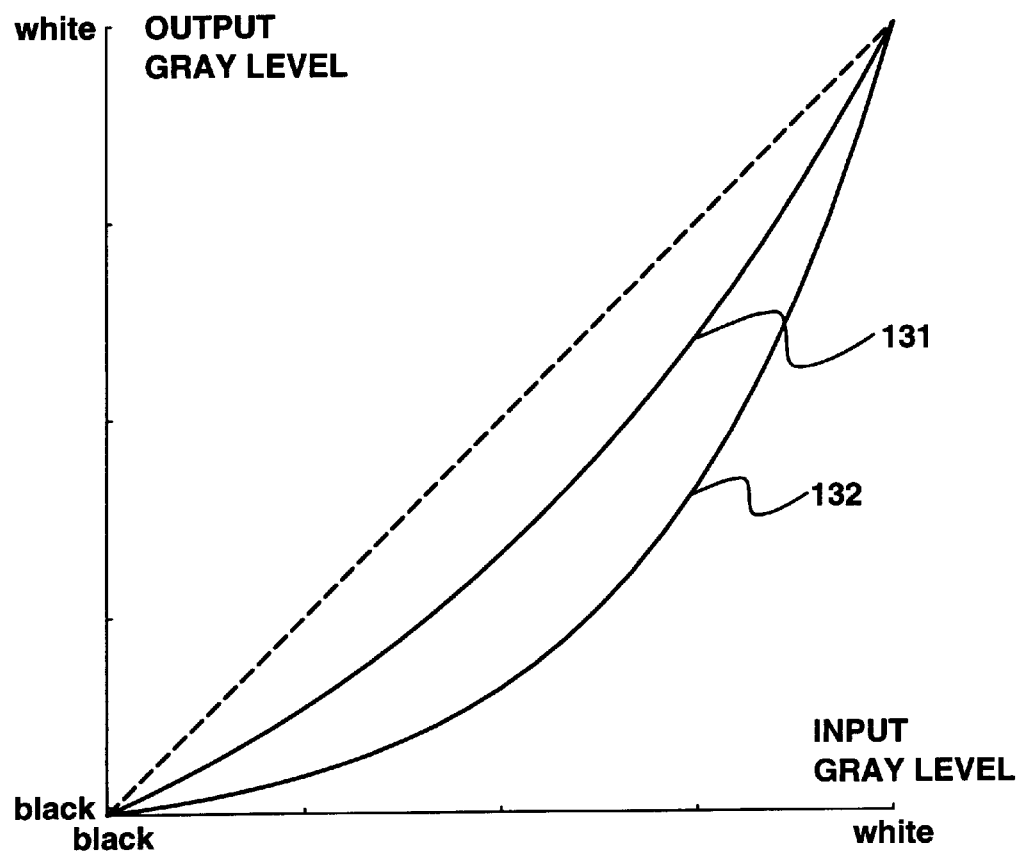
FIG. 13 shows graphs giving the dot gain for two different subscreen elements.

FIG. 13 illustrates the phenomenon of dot gain as a function of the area of the subscreen element. Small area subscreen elements (132) have a strong dot gain and need a severe dot gain compensation (gamma correction) whereas large area subscreen elements (131) have a small dot gain and require a smaller dot gain compensation (gamma correction).

Before detailing the method for generating halftone images using screen elements with evolutionary screen dot contours, let us consider the basic principle of halftoning based on evolutionary screen dot contours which bound the white and black parts of each screen element, as shown in FIG. 1. Let us imagine that the output image pixel plane is divided into adjoining rectangular areas made up of screen elements which pave the output image plane. Each screen element (101) is associated with a contour (102) whose interior is blackened. The contours evolve continuously according to the gray level of the input source image.

Figures 1A, 1B, 1C, 1D, 1E:
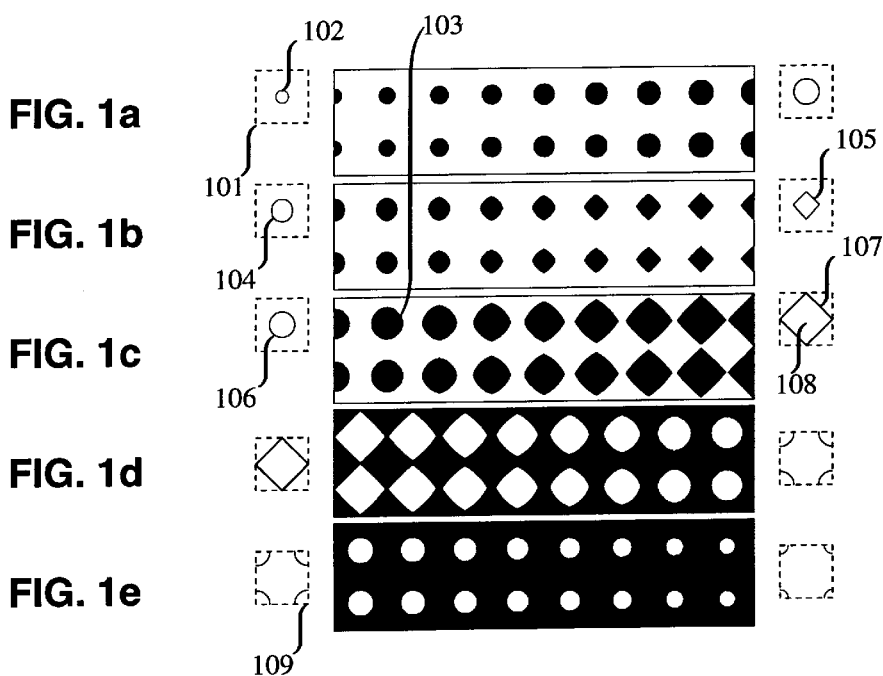
FIG. 1 shows various types of evolution for screen dot contours bounding the black and white parts of each screen element such as growth and pure positive scaling (FIG. 1a), pure interpolation (FIG. 1b), positive scaling with interpolation (FIG. 1c), negative scaling with interpolation (FIG. 1d) and decrease or negative scaling (FIG. 1e)

The central part (103) of each of figures FIG. 1a, FIG. 1b, FIG. 1c, FIGS. 1d and 1e shows the resulting image produced using an input image made of a horizontal band whose graded intensity level varies slightly horizontally. In the case shown in FIG. 1a, the contour (102) is subjected to a growth or scaling relative to the center of the screen element. In the case shown in FIG. 1b, the contour is subjected to an interpolation between the round figure (104) on the far left and the square figure (105) on the far right. There is no scaling in this case. In the case shown in FIG. 1c, the contour undergoes a combined transformation made up of a scaling and of an interpolation between the round figure (106) on the far left and the square figure (107) on the far right. FIGS. 1d and 1e illustrate complementary cases to those shown in FIGS. 1c and 1a. In both cases, the growth or positive scaling is replaced by a decrease or negative scaling and the scaling center lies at the top of the rectangle (109) which forms the screen element (instead of in the middle of the rectangle (108), as is the case in FIGS. 1a, 1b and 1c).

It is thus possible to differentiate between five different types of contour evolutions bounding the white and black parts of each screen element: pure positive growth or scaling (e.g. FIG. 1a), pure interpolation (e.g. FIG. 1c), negative scaling with interpolation (e.g. FIG. 1d) and pure decrease or negative scaling (e.g. FIG. 1e). Henceforth, the generic word interpolation will include all types of evolution described above.

Each fixed predefined contour bounding black and white screen element areas is made up of a sequence of curve segments described for example by polynomial spline functions such as segments of 3rd order Bézier curves which are commonly used by interactive curve drafting software packages. Bézier curves for example are given by the coordinates of the vertices of their control polygons [Farin88].

In order to make it easier to calculate a screen dot contour associated with an intermediate gray level, the fixed predefined contours can be made up of the same number of curve segments. If the respective curve segments are all described using a single mathematical representation such as the third order Bézier curve representation, the interpolation between two contour elements made up of curve segments is obtained by interpolating between the control points of the corresponding curve segments. The new control points obtained in this way define the desired interpolated segments.

A transformation between a screen dot definition space and a screen dot rendition space is defined so as to ensure maximum flexibility when generating screen elements using evolutionary contours. An interpolated contour, also known as as an intermediate contour, is obtained by interpolating between predefined fixed contours for each desired intensity level. The interpolation can be performed either in the screen dot definition space or in the screen dot rendition space. If the interpolation is carried out in the screen dot definition space, the transformation between the screen dot definition space and the screen dot rendition space is applied to the interpolated contours. However, if the interpolation is carried out in the screen dot rendition space, the fixed predefined contours will previously have been transformed from the screen dot definition space to the screen dot rendition space.

Figure 2:
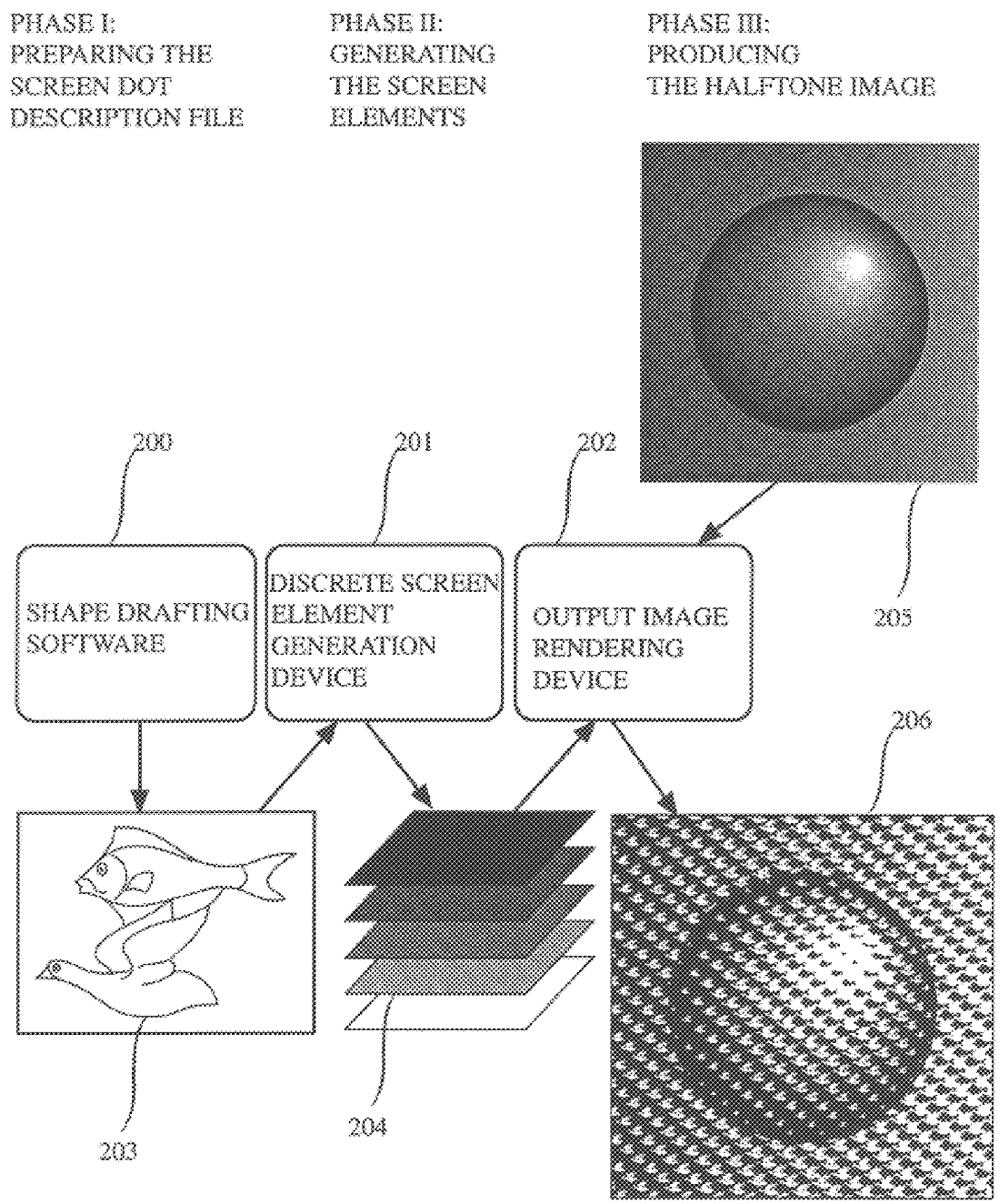
FIG. 2 shows an example of the various phases occurring in the reproduction process of a halftone image using evolutionary screen dot contours halftoning.

Let us take as an example the process shown in FIG. 2 for reproducing a halftone image using evolutionary screen dot contours. The process is divided into three distinct phases:

phase I deals with the preparation of the file which describes the screen dot contours using fixed predefined contours (200);

phase II during which the discrete screen elements are generated by interpolating between fixed predefined contours, by transforming interpolated contours from the screen dot definition space to the screen dot rendition space and by scan-converting and filling the transformed interpolated contours obtained in this way (201);

phase III during which the halftone image (206) is rendered (202) from an input grayscale image (205) by making use of the discrete screen elements generated during phase II.

The operations described in phase II may be carried out in a different order, i.e. by first transforming the fixed predefined contours from the screen dot definition space to the screen dot rendition space and then by interpolating between the transformed fixed predefined contours so as to obtain in the screen dot rendition space interpolated contours which correspond to the desired intensity levels. In the following description, we only discuss a single type of sequence for the interpolation and transformation operations occurring in phase II. Other types of sequences for interpolation and transformation operations can easily be deduced by people knowledgeable in the art.

Phase I: Preparing the Screen Dot Description File

The aim of phase I, during which the screen dot description file is prepared, is to provide a complete description of the various elements required to generate discrete screen elements. The screen dot description file comprises the following elements.

Figure 3:
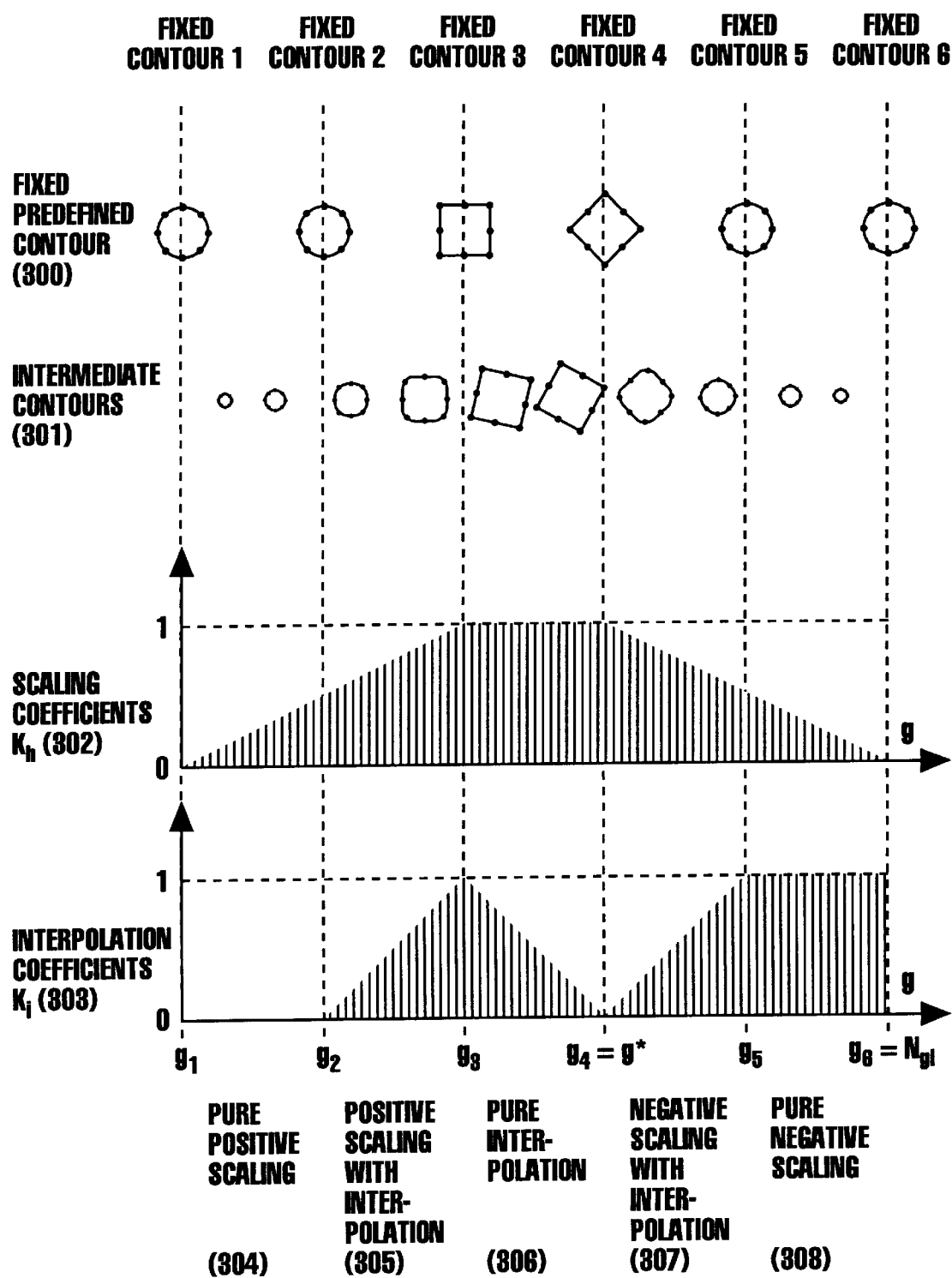
FIG. 3 shows some of the elements required for generating discrete screen elements using evolutionary screen dot contours: fixed predefined contours (300), intermediate contours (301), scaling coefficients (302) and interpolation coefficients (303), graphically represented on the gray scale axis g.
Figure 4A:
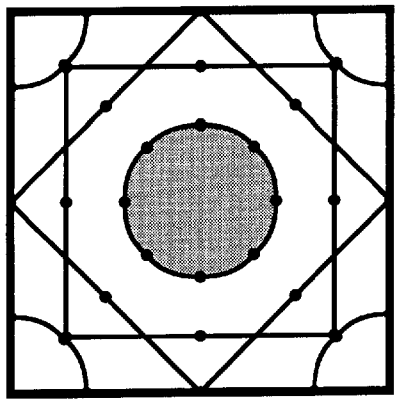
FIG. 4a, FIG. 4b, FIG. 4c, FIG. 4d, show examples of screen elements with fixed predefined contours corresponding to different gray levels.
Figure 4B:
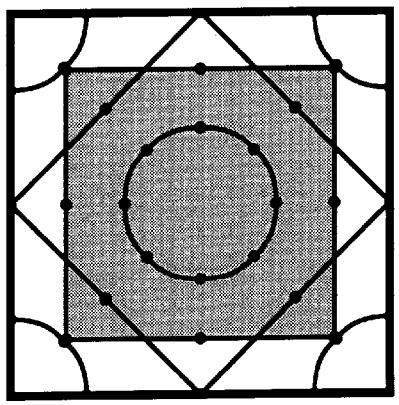
Figure 4C:
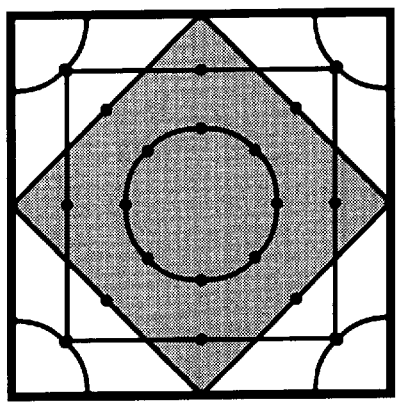
Figure 4D:
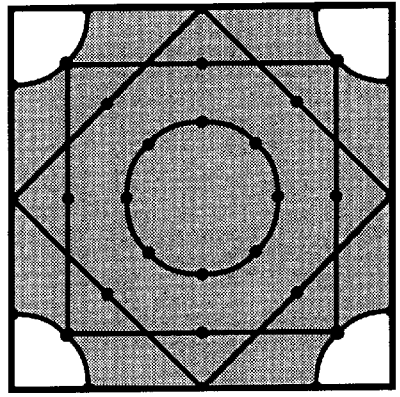

A) A list of fixed predefined contours. There will be at least two of them so as to ensure that halftoning evolves between a minimum (0) and a maximum ($N_{gl}$–1) intensity level. FIG. 3 (300) shows an example of six fixed predefined contours. It is possible to consider, as an example, a contour to be a series of straight line segments and curve segments described by Bézier polynomials. Other definitions of contours are also applicable. What counts is the bijective correspondance between the descriptions of fixed predefined contours so that one contour may be made to evolve by interpolation towards another.

Figure 24:
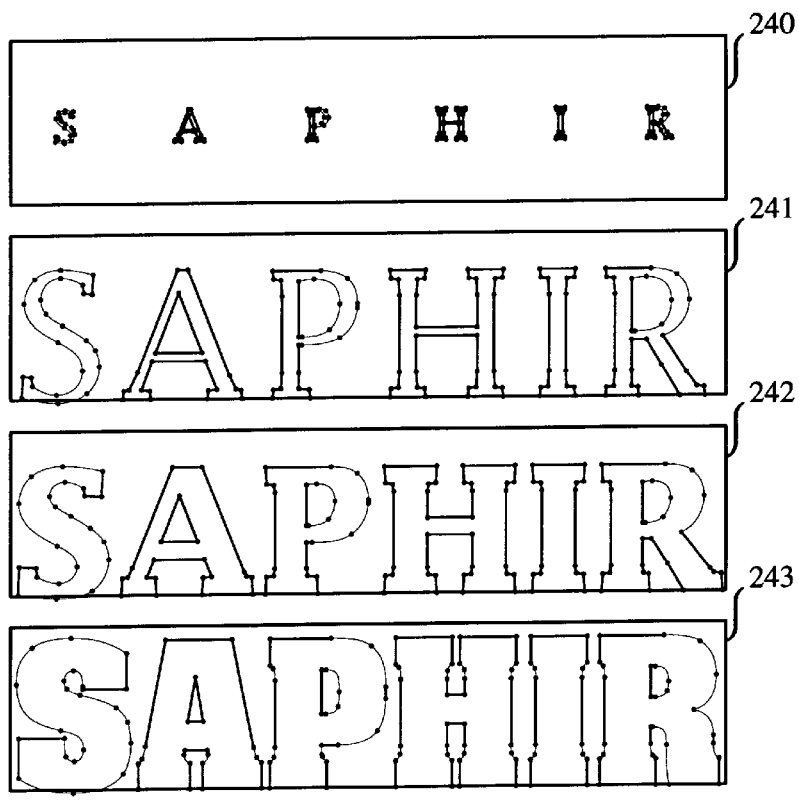
FIG. 24 shows large screen elements with screen dots composed of several contours representing typographic character outlines.

In the case of screen dots made of letter shapes, a large screen element may contain several successive character contours representing successive typographic letters following one another. In this case, the preparation of the screen dot description file will require the definition and placement of character outline descriptions as fixed predefined contours, as shown in the example of FIG. 24. In that example, fixed predefined contours are defined for the following intensity levels, ranging from 0 (white) to 255 (black): fixed predefined contours (240) for intensity level 0 (white or nearly white), fixed predefined contours (241) for intensity level 80 (mostly white), fixed predefined contours (242) for intensity level 128 (half white, half black), fixed predefined contours (243) for intensity level 255 (black or nearly black).

B) A table of scaling coefficients $\kappa_h$ (FIG. 3, 302) which is made up of $N_{gl}$ entries where $N_{gl}$ represents the number of different intensity levels to be reproduced in the output halftone image. At high resolution or in order to obtain large size screen dots, it is possible to consider reproducing for example $N_{gl}$=256 different intensity levels for input images whose pixels are coded on 8 bits. The access index to this table is determined by gray level g of the current input image pixel. Each entry in the scaling coefficient table determines the scaling coefficient associated with the corresponding gray level.

C) A table of interpolation coefficients $\kappa_i$ (FIG. 3, 303) which has $N_{gl}$ entries. The access index of this table corresponds to gray level g of the current input image pixel. Each entry in the interpolation coefficient table determines the interpolation coefficient associated with the corresponding gray level.

The six fixed predefined contours define five distinct areas: the growth or pure positive scaling area (304), the growth and positive interpolation area (305), the pure interpolation area (306), the decrease and negative interpolation area (307) and the decrease or pure negative scaling area (308). Each area is characterized by its domain whose boundaries are defined by given gray levels $g_i$, to be found between 0 and $N_{gl}$–1. In the example of FIG. 3, the given gray levels at the boundaries of each area are levels $g_1$, $g_2$, $g_3$, $g_4$, $g_5$, $g_6$. The fixed predefined contours are associated with said boundaries. An arbitrary gray level can only belong to one area (see FIG. 3). Intermediate contours generated by interpolation between fixed predefined contours are shown in FIG. 3, (301).

FIG. 4 shows the shapes of a screen dot for gray levels corresponding to the fixed predefined contours.

In the following description, which illustrates a preferred embodiment of the method, we shall distinguish between the screen dot definition space and the screen dot rendition space. The screen dot definition space is the space within which the fixed predefined contours are given. The screen dot rendition space is the space within which the scan-conversion and filling operations convert an area which is bounded by intermediate contours into sets of discrete black and white pixels.

Figure 14:
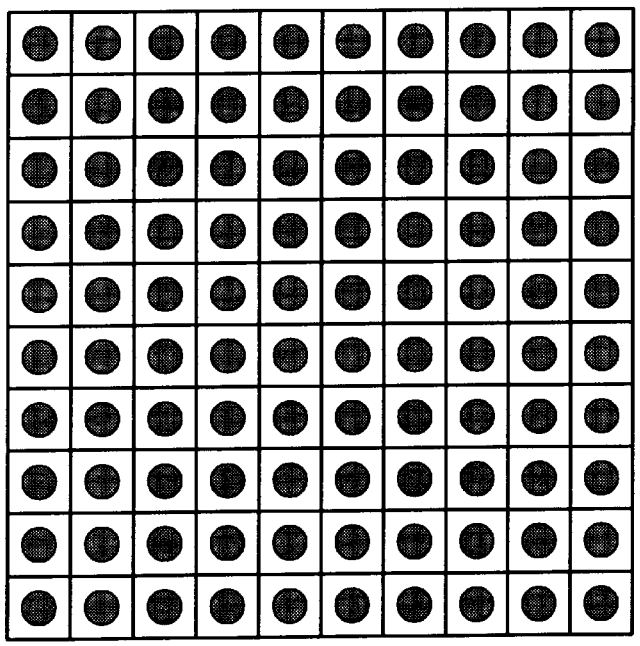
FIG. 14 illustrates an example of a transformation from a screen dot definition space towards a screen dot rendition space, thus producing subscreen elements and subscreen dots whose size and period are variable.
Figure 14:
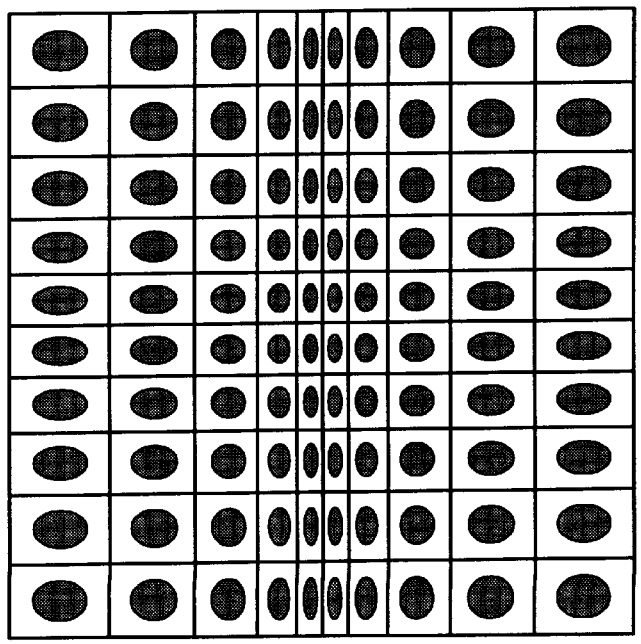
Figure 15:
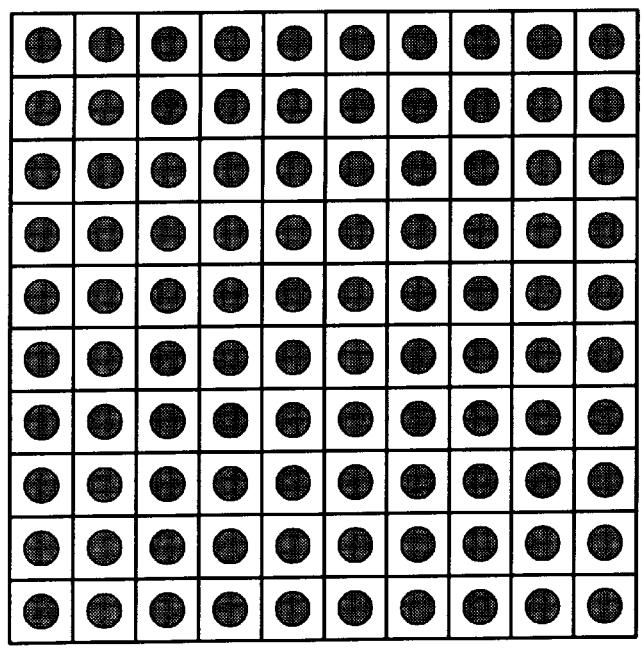
FIG. 15 illustrates another example of a transformation from a screen dot definition space towards a screen dot rendition space.
Figure 15:
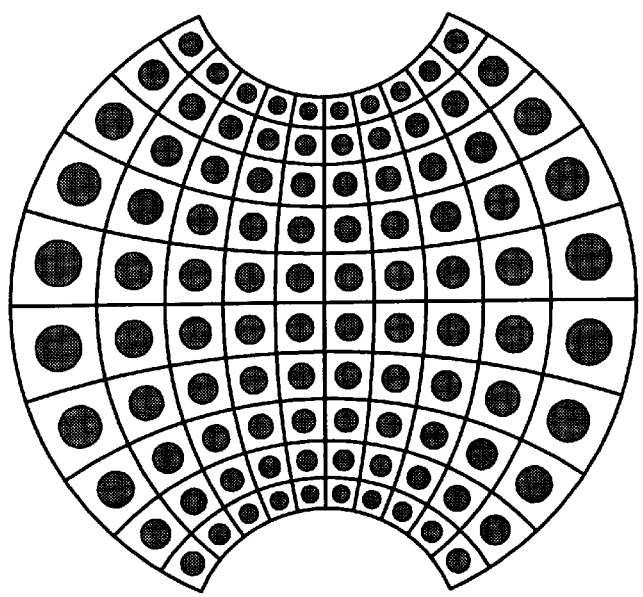

A freely chosen function is used for the transformations from the screen dot definition space to the screen dot rendition space. If this function is chosen in an appropriate manner and if the screen element under consideration is a screen element possibly subdivided into adjoining subscreen elements, and containing a plurality of distinct subscreen dots defined by fixed predefined contours, a large number of screen dots of varying shapes, periods and surfaces can be generated in the screen dot rendition space (for example FIG. 14 and FIG. 15).

Figure 16:
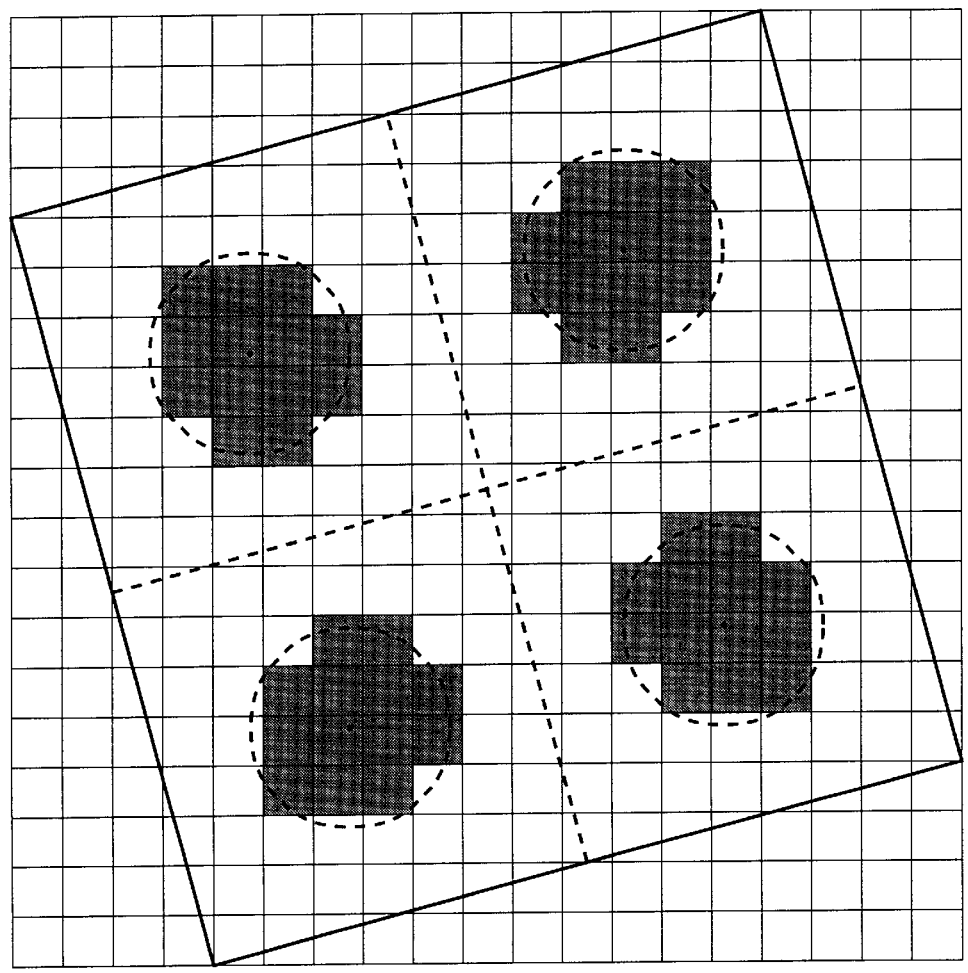
FIG. 16 illustrates an example of a screen element with a definite orientation, made up of several subscreen elements.

It is also possible to choose a precisely angled screen orientation (for example an angle close to 15 degrees) for the large screen element and to generate the subscreen elements within the large screen element by using contours which are repeated inside each of the subscreen elements (FIG. 16). Since the screen elements can be made as large as desired by dividing them into a plurality of adjoining subscreen elements, it is possible to produce an angled screen layer approximating a desired orientation to any desired precision. Exact angle screen layers are needed in order to avoid moiré effects in multilayer colour reproduction [Fink92].

Figure 21:
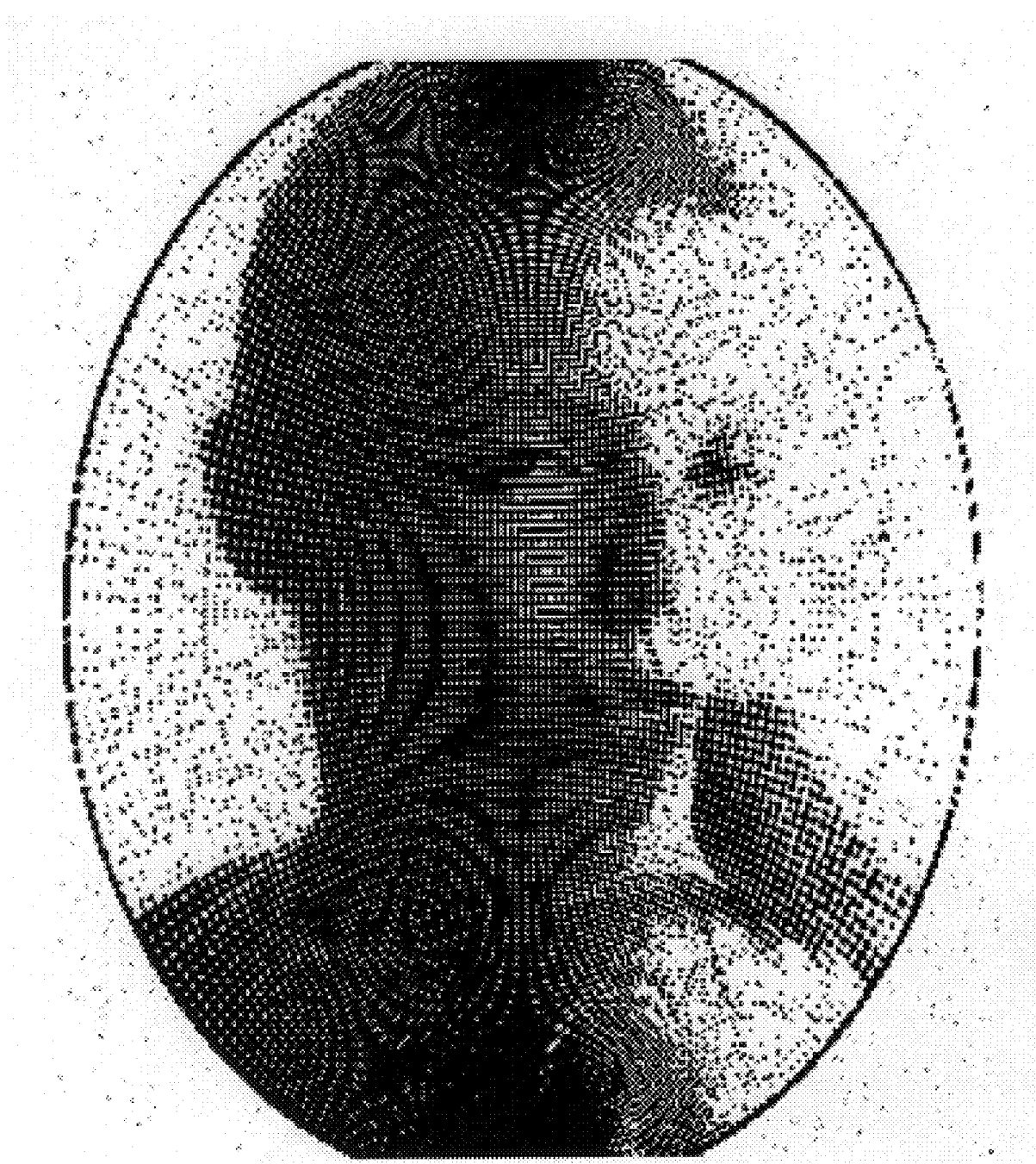
FIG. 21 illustrates the moiré effects which may occur when digitizing the halftone image shown in FIG. 20.
Figure 22A:
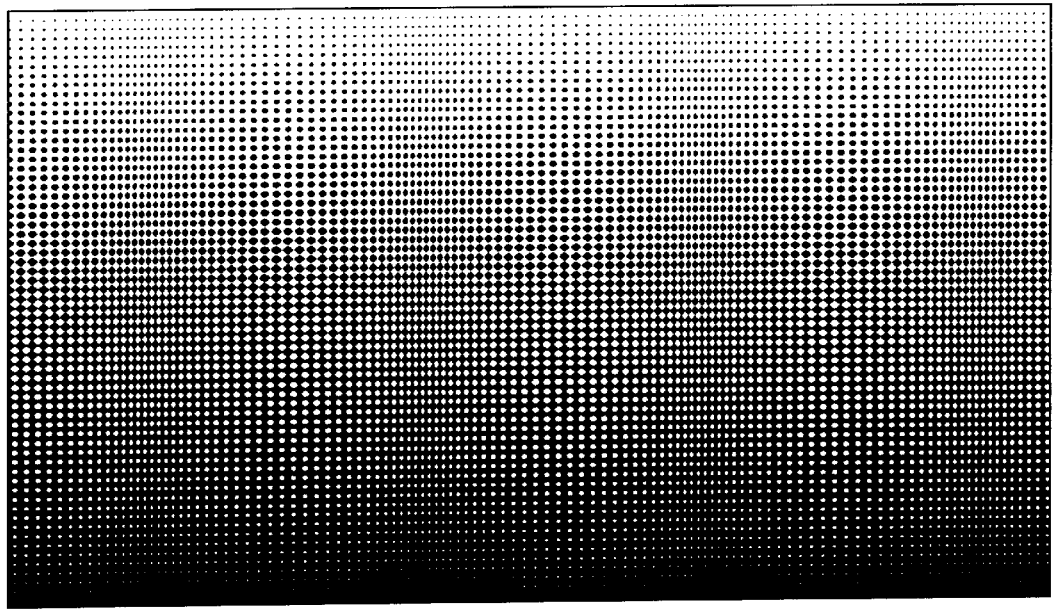
FIG. 22a shows an example of a halftone image with variable size subscreen dots and FIG. 22b shows an example of the effect produced by the optical reproduction of such an image.
Figure 22B:
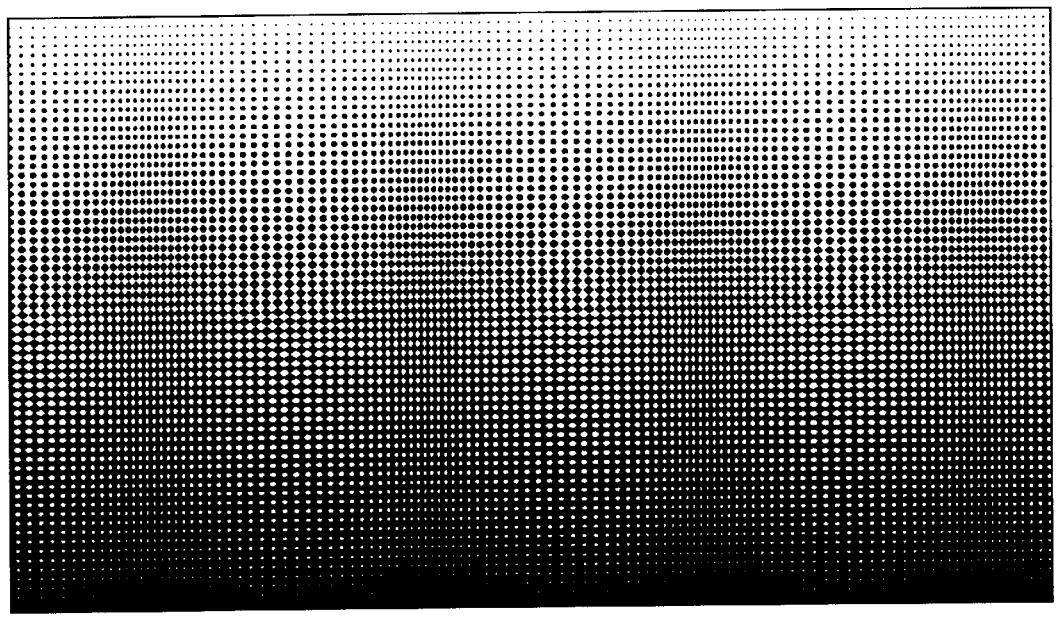

Variations of the halftoning period are useful to prevent non authorized copies of images produced in this manner. This is due to the fact that small screen dots and large screen dots are subjected to a different dot gain during reproduction. When reproducing the original image on a target printing device, this dot gain variation is compensated for by dot gain compensation factors which take into account the surface of the current screen dot. In the case of optical reproduction (photocopying), this variation is not compensated for and generates variations of light intensity which are a function of the size of the subscreen element, respectively the size of the subscreen dot. As an example, FIG. 22b illustrates the flutter produced when photocopying the image in FIG. 22a. Furthermore, the variable subscreen element, respectively subscreen dot period and area prevent a faithful counterfeit by a digital scanner. Scanning and digitizing a halftone image having variable sized subscreen elements, respectively subscreen dots (for example FIG. 20) at a frequency of the same order as the frequency of some of the subscreen elements, respectively subscreen dots of the halftone image generates very visible moiré effects (FIG. 21), thus making faithful counterfeiting almost impossible.

Figure 5A:
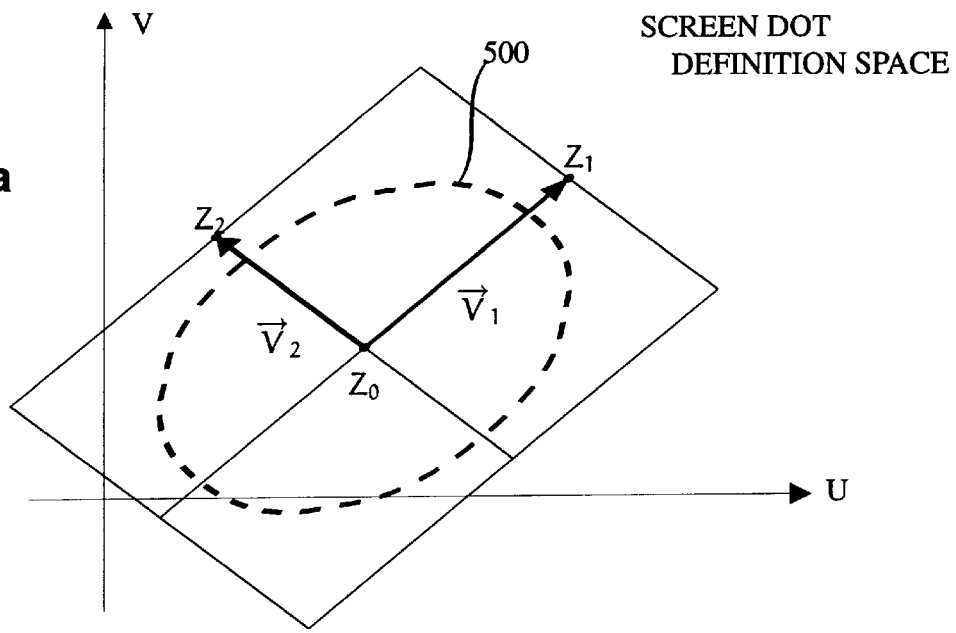
FIG. 5a shows an example of an intermediate screen dot contour in the screen element definition space and FIG. 5b an example of an intermediate screen dot contour in the screen dot rendition space.
Figure 5B:
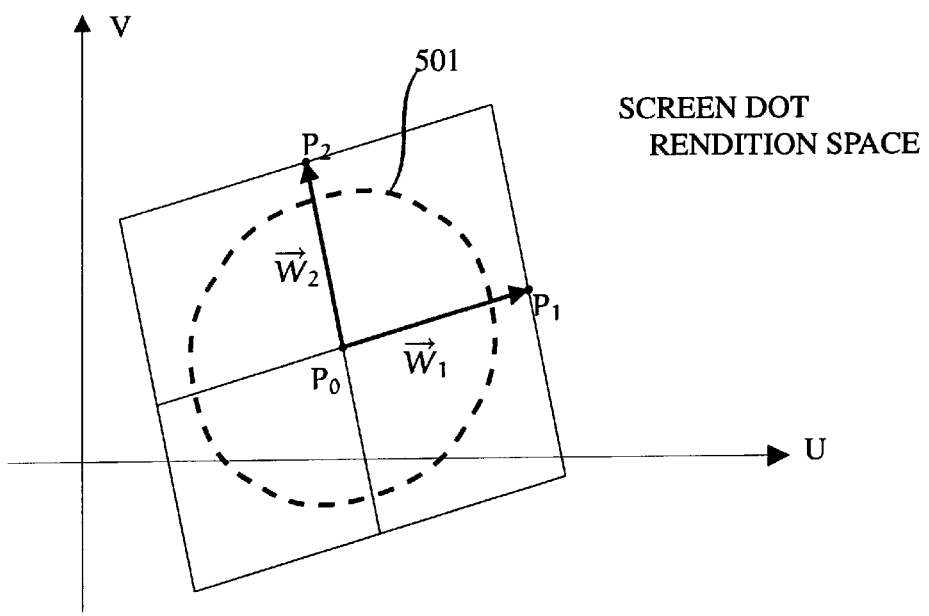

In the case of a linear transformation between screen-dot definition space and screen-dot rendition space, each fixed predefined contour is characterized by the following main elements, as in the example illustrated by FIG. 5:

reference point $\vec{Z}_0$ of the contour in the screen dot definition space;

vectors $\vec{V}_1$ and $\vec{V}_2$ which define the parallelogram of the screen element in the screen dot definition space;

the control points associated with the contour segments which define in a unique manner the contour (500) whose coordinates are given in the screen dot definition space;

reference point $\vec{P}_0$ of the contour (501) in the screen dot rendition space;

vectors $\vec{W}_1$ and $\vec{W}_2$ which define the parallelogram of the screen element in the screen dot rendition space;

Phase II: Discrete Screen Element Generation

Discrete screen element generation comprises interpolation and transformation operations followed by scan-conversion and filing. As an example, we give the detailed sequence of operators for the case where interpolation occurs in the screen dot definition space and where the interpolated contours are transformed from screen dot definition space to screen dot rendition space.

In this case, the following operations are to be carried out for each gray level $g_i$ between 0 and ($N_{gl}$-1), $N_{gl}$ being the number of gray scales represented in the halftone output image, with for example $N_{gl}$=256.

1. Find, in the screen dot definition space, the interpolated contour based on the fixed predefined contours associated with the boundaries of the area to which gray level $g_i$ belongs. The coordinates $\vec{Z}$ of a control point of the intermediate contour are defined in the following manner:

$$\vec{Z} - \vec{Z}_0 = \kappa_h((1-\kappa_i)(\vec{Z}_L - \vec{Z}_0) + \kappa_i(\vec{Z}_R - \vec{Z}_0)) \quad (1)$$

where $\vec{Z}$ are the coordinates of the desired control point, $\vec{Z}_0$ are the coordinates of the reference point in the screen dot definition space, $\kappa_h$ and $\kappa_i$ are the scaling and interpolation coefficients defined by corresponding tables, and $\vec{Z}_L$ and $\vec{Z}_R$ are the coordinates of the control points which correspond to the fixed predefined contours located on the left and right boundaries of the area (FIG. 3) to which gray level $g_i$ belongs.

2. Find in the screen dot rendition space the image of the interpolated contour. The transformation applied between the screen dot definition space and the screen dot rendition space is a transformation t which can be freely chosen. For example, in the case of a linear transformation $t_l$, (see FIG. 5. as an example) reference point $Z_0$ has its image in $P_0$ $$\vec{Z}_0 \overset{t_l}{\to} \vec{P}_0$$

and points $Z_1$ and $Z_2$, located in the middle of the sides of the screen element parallelogram in the screen dot definition space, have as images points $P_1$ and $P_2$ located in the middle of the sides of the screen parallelogram in the screen dot rendition space $$\vec{Z}_1 \overset{t_l}{\to} \vec{P}_1 \quad (2)$$
$$\vec{Z}_2 \overset{t_l}{\to} \vec{P}_2.$$

This transformation $t_l$ can be characterized by a transformation matrix A and by a translation vector e $$A = \begin{pmatrix} a & b \\ c & d \end{pmatrix} \quad (3)$$

$$e = \begin{pmatrix} f \\ g \end{pmatrix}$$

where elements a, b, c, d, e, f and g can be calculated using the following formulae:

$$a = \frac{V_{y2}W_{x1} - V_{y1}W_{x2}}{-(V_{x2}V_{y1}) + V_{x1}V_{y2}} \quad (4a)$$

$$b = \frac{-(V_{x2}W_{x1}) + V_{x1}W_{x2}}{-(V_{x2}V_{y1}) + V_{x1}V_{y2}} \quad (4b)$$

$$c = \frac{V_{y2}W_{y1} - V_{y1}W_{y2}}{-(V_{x2}V_{y1}) + V_{x1}V_{y2}} \quad (4c)$$

$$d = \frac{-(V_{x2}W_{y1}) + V_{x1}W_{y2}}{-(V_{x2}V_{y1}) + V_{x1}V_{y2}} \quad (4d)$$

$$f = P_{x0} - Z_{x0}; \, g = P_{y0} - Z_{y0}$$

where $V_{x1}$, $V_{y1}$ and $V_{x2}$, $V_{y2}$ are respectively components x and y of vectors $\vec{V}_1$ and $\vec{V}_2$ which define the parallelogram of the screen element within the screen dot definition space, $W_{x1}$, $W_{y1}$, $W_{x2}$, $W_{y2}$ are respectively the x and y components of vectors $\vec{W}_1$ and $\vec{W}_2$ which define the parallelogram of the screen element in the screen dot rendition space, and $Z_{x0}$, $Z_{y0}$ and $P_{x0}$, $P_{y0}$ are respectively the x and y components of vectors $\vec{Z}_0$ and $\vec{P}_0$ which define the reference points of the screen element respectively in the screen dot definition space and in the screen dot rendition space.

Figure 17:
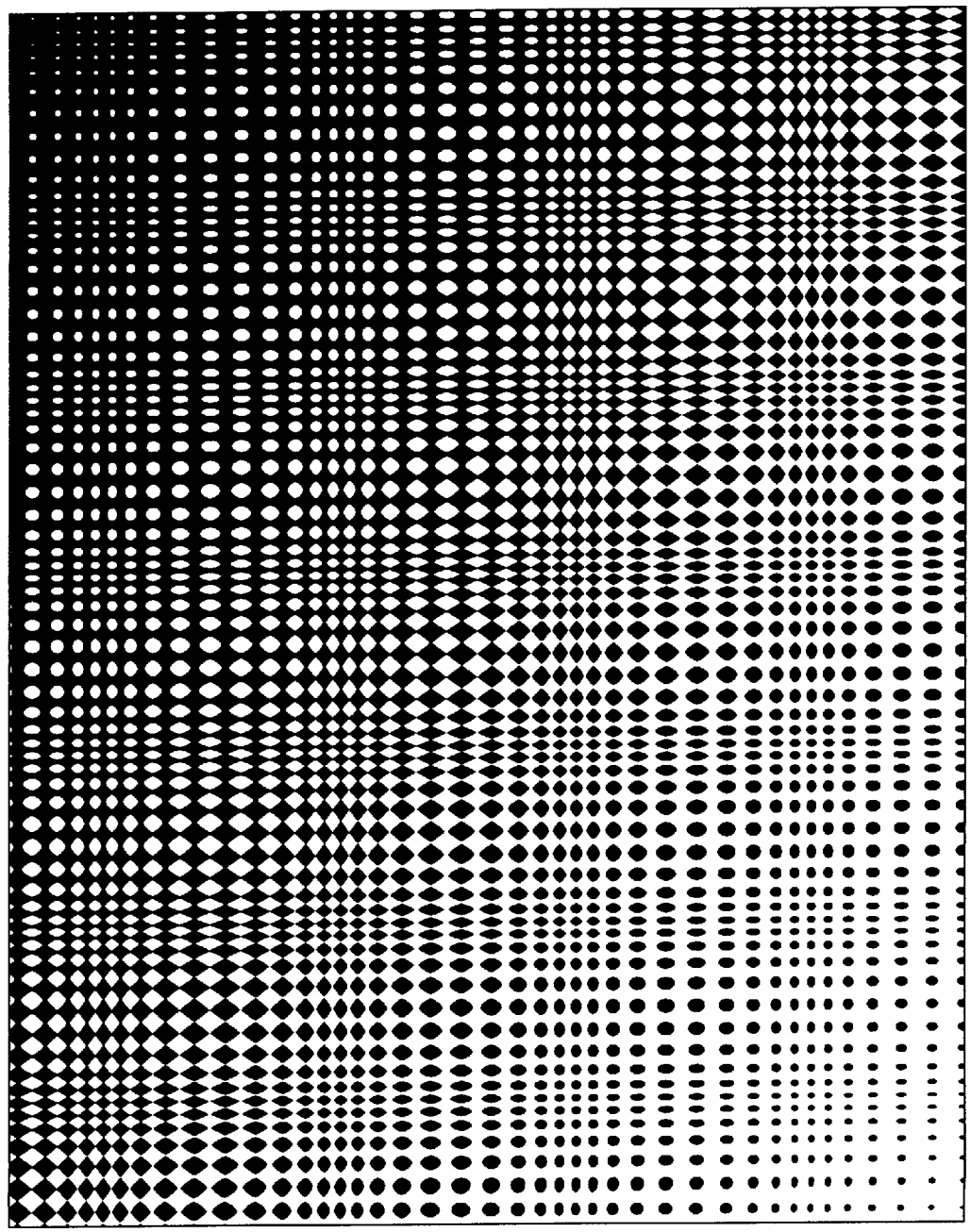
FIG. 17 illustrates an example of how a grayscale wedge source image can be halftoned using a large screen element made up of a plurality of subscreen dots.
Figure 18:
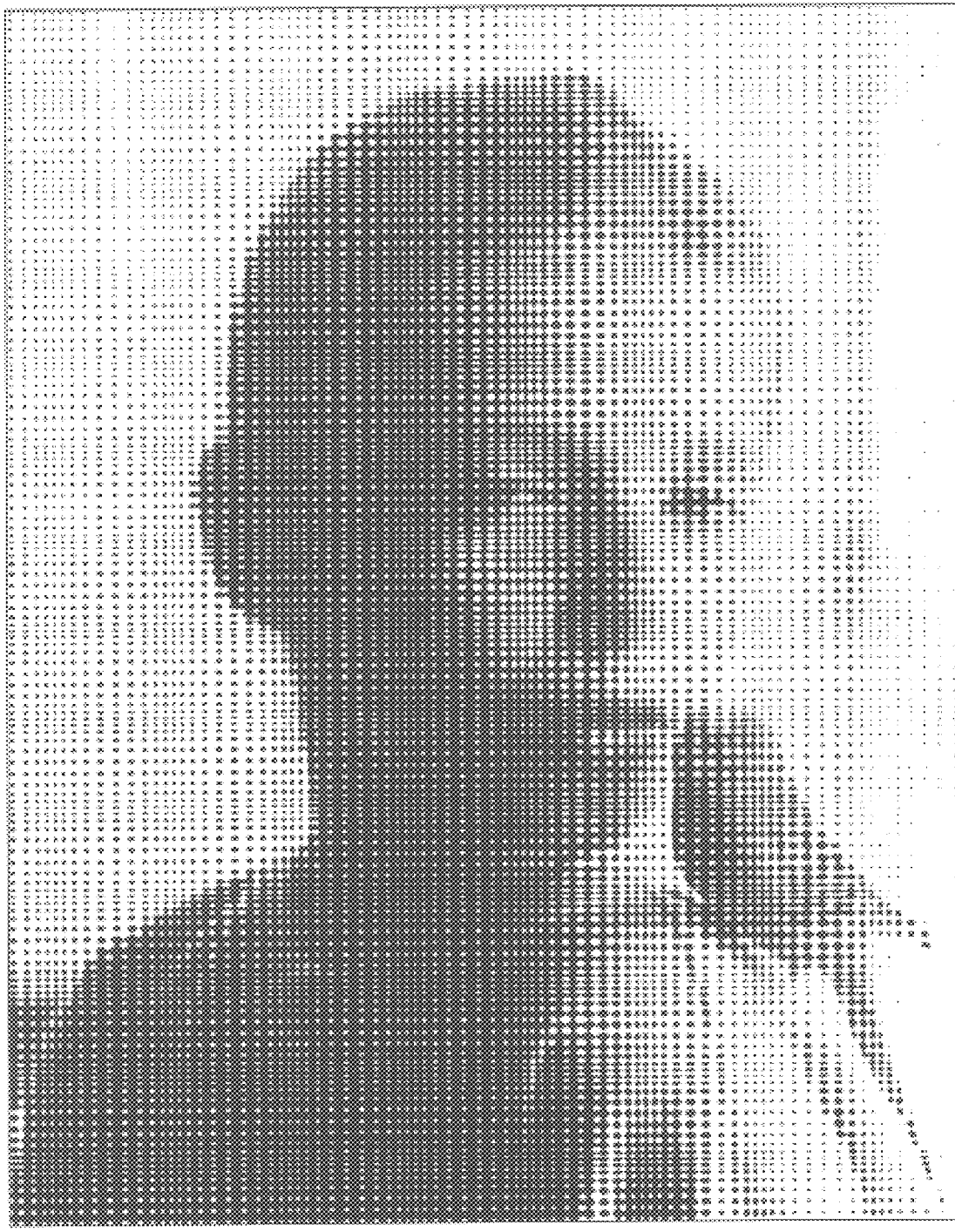
FIG. 18 illustrates how a variable intensity image can be halftoned using a large screen element made up of a plurality of subscreen dots.

Other linear or non linear transformations can also be applied. FIGS. 17 and 18 show, as an example, halftone images generated using the invented method. In the concrete case of FIGS. 17 and 18, the sinusoidal transformation $t_s$ between the screen dot definition space and the screen dot rendition space is described by the following formula:

$$x' = k_1 * x + k_2 * \sin(k_3 * x)$$
$$y' = k_4 * y + k_5 * \sin(k_6 * x)$$

where $k_1$, $k_2$, $k_3$, $k_4$, $k_5$ and $k_6$ are parameters characterizing transformation $t_S$.

Figure 19:
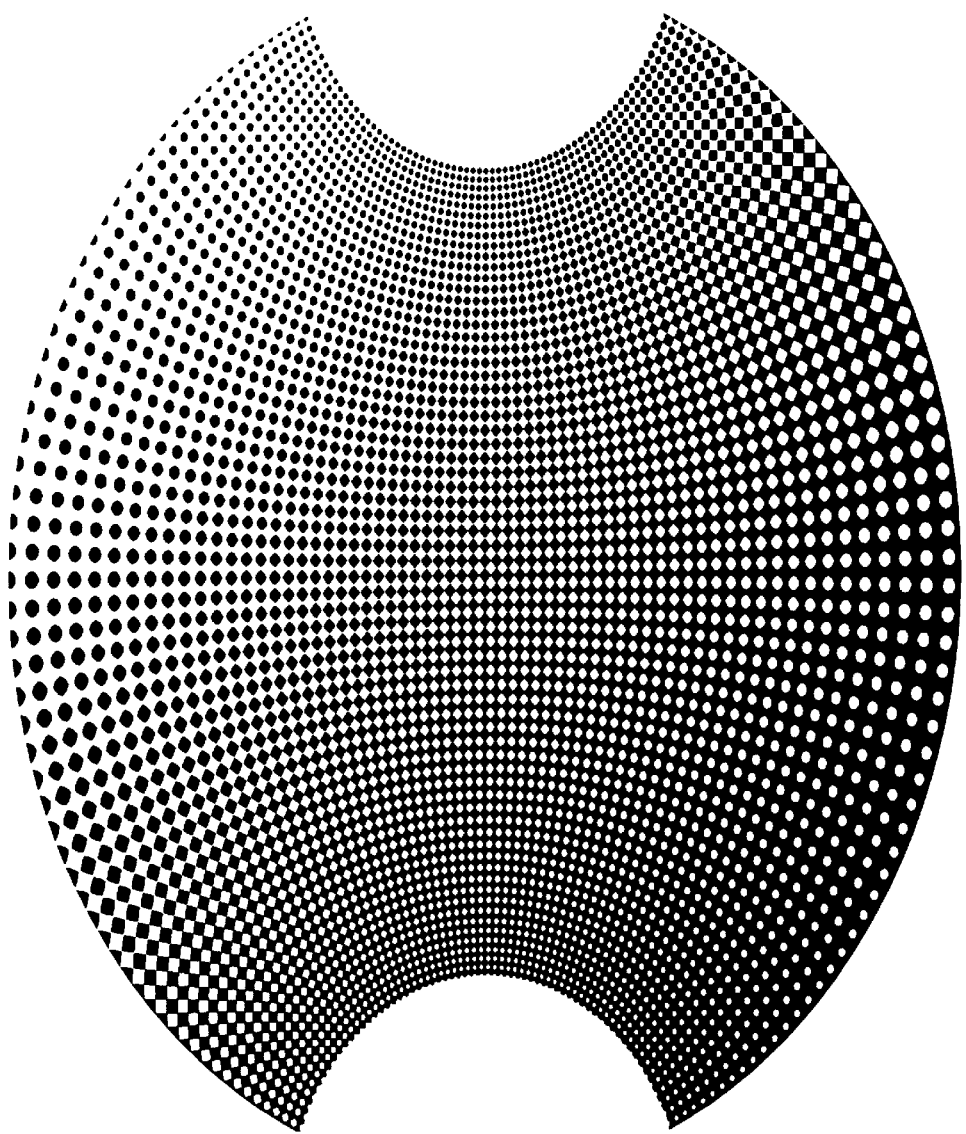
FIG. 19 illustrates an example of how a grayscale wedge source image can be halftoned using a large screen element made up of a plurality of subscreen dots.
Figure 20:
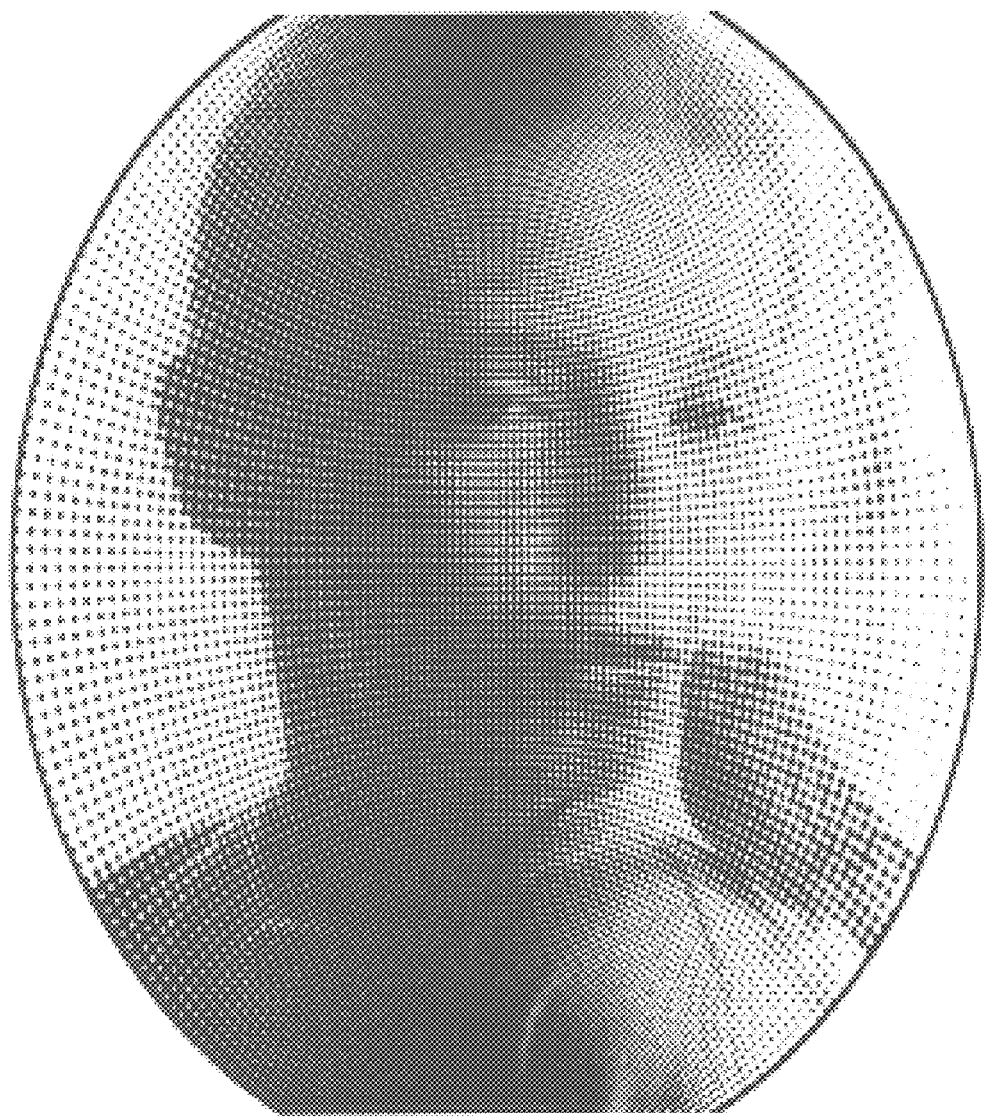
FIG. 20 shows a halftone image which has been generated using a transformation from screen element definition and screen element rendition space similar to that illustrated in FIG. 19.
Figure 26A:
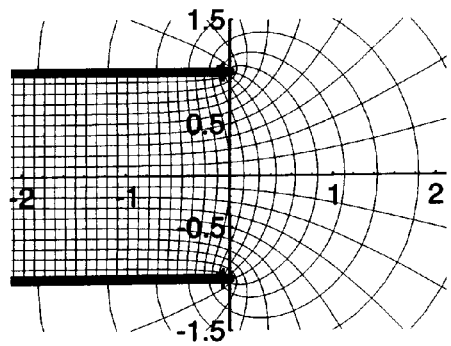
FIG. 26a shows the field lines characterizing a conformal mapping.
Figure 26B:
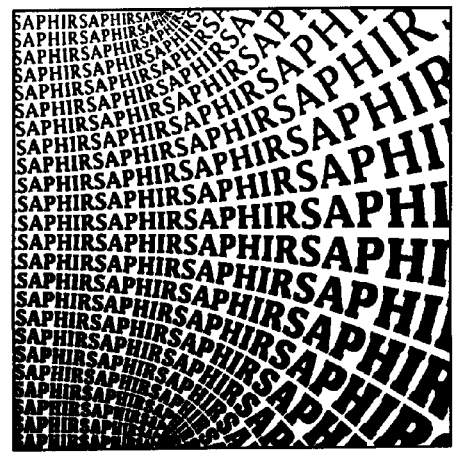
FIG. 26b gives an example of a grayscale wedge source image rendered by discrete screen elements with screen dots made of character outlines to which said conformal mapping was applied.
Figure 27A:
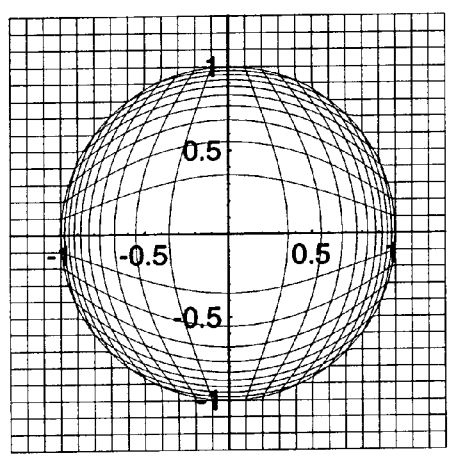
FIG. 27a shows a fish-eye mapping.

FIGS. 19 and 20 show, as an example, halftone images generated using the invented method. In the concrete case of FIGS. 19 and 20, transformation $t_C$ between the screen dot definition space and the screen dot rendition space is described by the following formula:

$$x' = k_1 \frac{\sin(k_2 x + k_3)}{(\cos(k_2 x + k_3) + \cosh(k_4 y + k_5))} + k_6$$

$$y' = k_7 \frac{\sinh(k_4 y + k_5)}{(\cos(k_2 x + k_3) + \cosh(k_4 y + k_5))} + k_8$$

where $k_1$, $k_2$, $k_3$, $k_4$, $k_5$, $k_6$, $k_7$ and $k_8$ are parameters characterizing transformation $t_c$. In this case we are dealing with a conformal mapping of the type w=tgz, which is well-known in the field of complex analysis. One further halftone image generation example comprising a conformal mapping transformation (FIG. 26a) is shown in FIG. 26b. Another non-linear transformation, sometimes called fish-eye mapping, between screen dot definition space and screen dot rendition space is shown in FIG. 27a. This transformation allows enlarging some subscreen dot contours at the expense of their surrounding subscreen dot contours. For this purpose, one may define a circle of unit radius within which a geometric transformation maps the original rectangular grid into a highly deformed grid. This transformation keeps the angle and modifies the distance of points from the center of the circle. With the center of the circle as the origin of the coordinate system, the fish-eye mapping expressed in polar coordinates is the following:

$$\theta' = \theta$$

$$r' = \begin{cases} \dfrac{m * \dfrac{r}{1-r}}{1 + m * \dfrac{r}{1-r}} & \text{if } r < 1 \\ r & \text{otherwise} \end{cases}$$

where m is a magnifying factor.

3. In the screen dot rendition space, scan-convert and fill the area bounded by the so-obtained interpolated contour, so as to get a discrete screen element which corresponds to the final screen element associated with gray level $g_i$ (i.e. 62 in FIG. 6). Scan-conversion and filling is described in [Hersch91] and can be considered to be a standard operation. Let us note that this scan-conversion and filling operation preserves the complementary property. This property stipulates that, for two complementary contours, the dot planes generated by scan-conversion and filling should also be complementary. Without this property, the result would be faulty: some pixels in the output image would always remain white and uneven difference steps could occur between consecutive gray levels.

When scan-converting and filling the interpolated screen-dot contours, one may either only scan-convert and fill the black contour part on a white background (positive growth area), or only scan-convert and fill the white contour part on a black background (negative decrease area) or scan-convert and fill the black contour part on a white background (positive growth area) up to a gray level g* and scan-convert and fill the white contour part on a black background (negative decrease area) for the remaining gray levels.

In the case where screen-dot contours are made of typographic character outlines (typographic letter shapes) such as the ones shown in FIG. 24, scan-conversion and filling is simply applied to the black contour parts delimited by the character outlines.

Figure 6A:
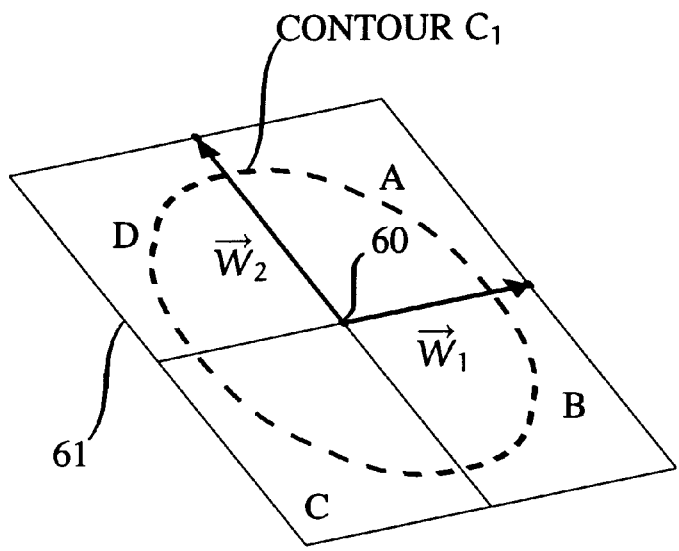
FIG. 6a and FIG. 6b illustrate the scan conversion and filling of an intermediate screen dot contour.
Figure 7A:
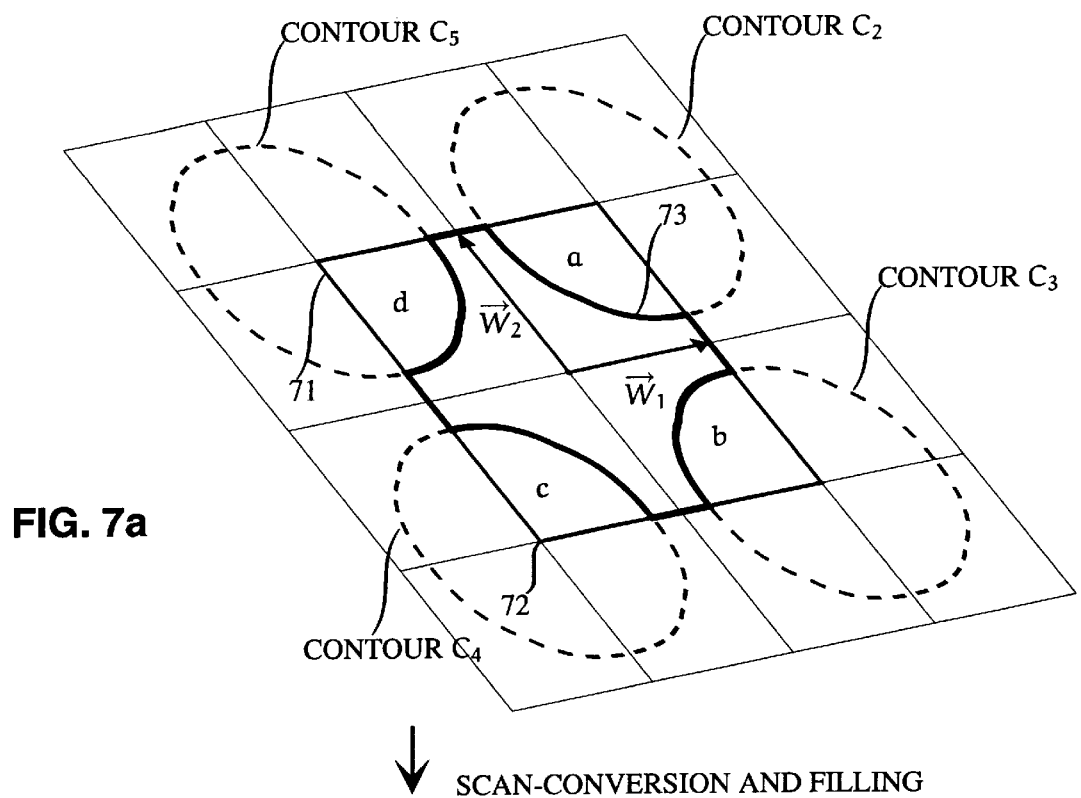
FIG. 7a and FIG. 7b show the scan conversion and filling of an intermediate screen dot contour for a gray level belonging to a negative decrease area.
Figure 7B:
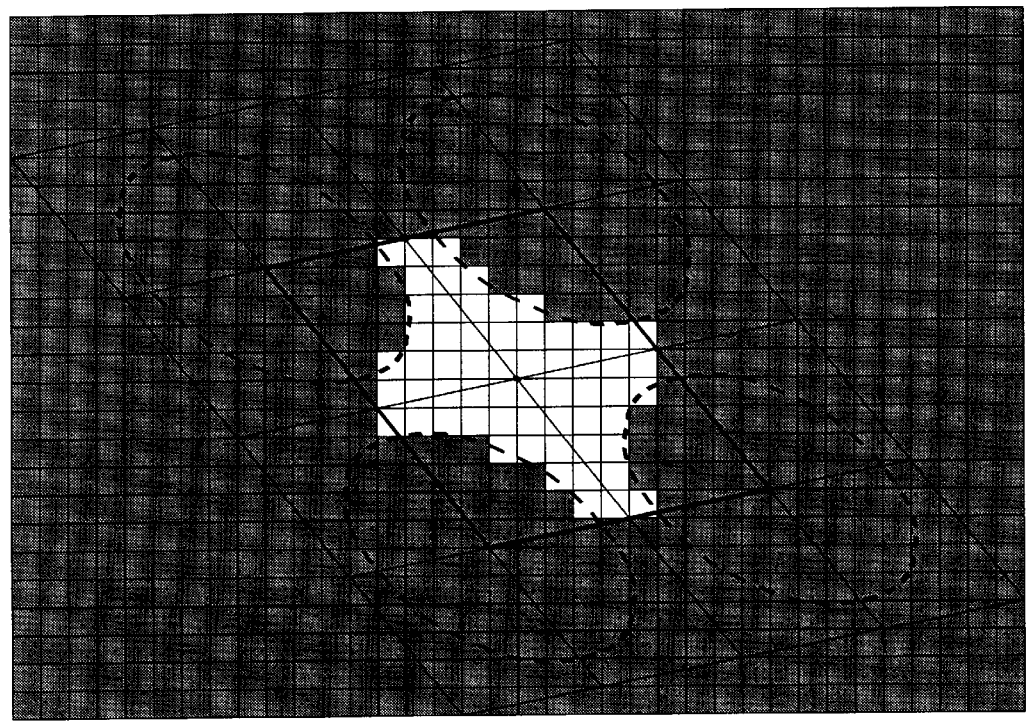

In the case where one scan-converts and fills the black contour part on a white background (positive growth area) up to a gray level g* and scan-converts and fills the white contour part on a black background (negative decrease area) an important point is the principle according to which a transition occurs from the positive growth area (FIG. 6a) to the negative decrease area (FIG. 7a). Up to gray level g* (the boundary value separating the two areas), scan-conversion and filling adds black dots inside the area of the screen element after it has been initialized in white, the area being bounded by the interpolated contour (63). For a gray level greater than g*, scan-conversion and filling generates white dots inside the area of the screen element which has previously been intitialized in black, the area being bounded by an intermediate contour (FIG. 7b). In the example of FIG. 7a, the intermediate contour (bold contour shown in FIG. 7a) is made up of the intersection of the parallelogram which makes up the screen element (71) with three replicates $C_2$, $C_3$ and $C_5$ of the same contour $C_4$ and which have been moved away from the center (72) of contour $C_4$ respectively by $(2\vec{W}_1 + 2\vec{W}_2)$, $2\vec{W}_1$, $2\vec{W}_2$.

Figure 6B:
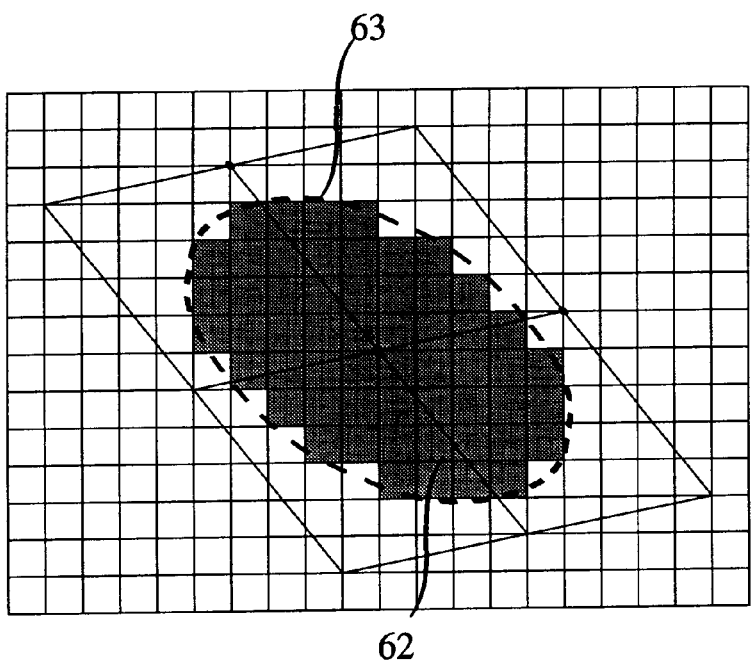

Let us assume, in the case of a screen element of parallelogram shape, that the parallelogram which forms the screen element (61) is subdivided, by two lines parallel to vectors $\vec{W}_1$ and $\vec{W}_2$ which intersect the center of the screen, into four congruent parallelograms A, B, C and D, in the positive growth area (FIG. 6a). In the same way, the parallelogram which forms the screen element (71) is subdivided, by two lines parallel to vectors $\vec{W}_1$ and $\vec{W}_2$ which intersect the center of the screen, into four isometric parallelograms a, b, c and d, in the negative decrease area (FIG. 7a). Since the centre of the positive figure (60) must coincide with one of the summits of the negative figure (72), the condition required to ensure a continuous transformation between the positive growth area and the negative decrease area can be formulated in the following manner: both intermediate contours generated for the same gray level g*, but respectively in the positive growth area (FIG. 6a) and in the negative decrease area (FIG. 7a) must be related to one another in the following way:

part A of contour $C_1$ must coincide with part c of contour $C_4$, part B of contour $C_1$ must coincide with part d of contour $C_5$, part C of contour $C_1$ must coincide with part a of contour $C_2$, part D of contour $C_1$ must coincide with part b of contour $C_3$.

The above-mentioned complementary principle will ensure continuous halftone images for consecutive gray levels beyond gray level g*. Generally, a fixed predefined outline will be associated with gray level g*, thus making discrete screen element generation easier both for gray levels lower than g* (screen dots generated by blackening, i.e. by activation) and for gray levels higher that g* (screen dots generated by whitening, i.e. by disactivation).

In the case where discrete screen elements are produced with screen dots made of typographic character outlines, a plurality of characters can be included as distinct subscreen dots within the screen element. For generating for example the image shown in FIG. 25, one screen element will be created with a screen dot description made of distinct subscreen dots "S", "A", "P", "H", "I", "R". In that case, the transformation between screen dot definition space and screen dot rendition space is just a linear scaling operation. For generating the example shown in FIG. 26b however, a large screen element must be prepared containing as subscreen elements the character string "SAPHIR". In said large screen element, the subscreen element made of the character string "SAPHIR" is repeated at least 5 times horizontally and 24 times vertically.

All the screen elements produced in this manner are stored as a file on a disk or in memory so that they can be used efficiently in the phase during which the output image pixel plane is generated. Only one screen element is stored for each gray level.

Phase III: Rendition of the Output Image

In phase III, the halftone output image is rendered. During this phase, each pixel of the input image with gray level g corresponds to a target rectangular area in the output image. Generating the output image consists of transferring a portion of the discrete screen element corresponding to gray level g from the screen dot rendition space towards this target rectangular area in the output image.

More precisely, one method for the rendition of all output image pixels comprises the step of scanning the source image scanline by scanline and pixel by pixel, computing for each pixel of the source image their target regions in the discrete screen element and in the output image and copying for each source image pixel said region of the discrete screen element associated with the intensity level of the current source image pixel onto said region of the output image.

Alternately, it is possible to scan the output image, to find for each pixel of the output image the corresponding pixel in the input image, to obtain its intensity level g, to look for the discrete screen element pixel in the screen element associated with this intensity level g, and to copy it to the desired pixel of the output image plane.

In phase III, dot gain compensation (gamma correction) may take place so as to ensure a well-spread out grayscale. Since the disclosed method may produce subscreen dots of varying areas for a single gray level, according to their position within the image, dot gain compensation is a multi variable function which depends on the desired gray level as well as on the position the subscreen element under consideration within the screen element. By printing samples with constant intensity levels covering the screen element space, one may generate the dot gain curves at different locations of the screen element. From these dot gain curves, it is possible to compute the multi-dimensional dot gain compensation table containing the dot gain compensation factors allowing finding for given input intensity levels and for given positions within a screen element the corresponding corrected intensity levels to be used for output halftone image rendition.

Figure 25:
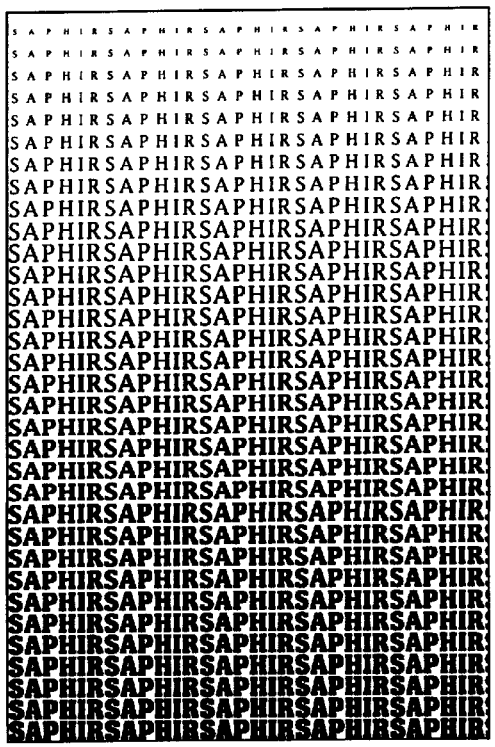
FIG. 25 gives an example of a grayscale wedge source image rendered with screen dots made of contours representing character outlines.
Figure 27B:
FIG. 27b gives an example of a grayscale wedge source image rendered by discrete screen elements with subscreen dots made of Kanji ideogram outlines which underwent a fish-eye non-linear transformation between screen dot definition space and screen dot rendition space.

FIG. 25 shows a grayscale wedge input image halftoned by using the discrete screen elements produced with the screen dots illustrated in FIG. 24. FIG. 26b shows a grayscale wedge input image halftoned with a large screen element made of subscreen elements containing the string "SAPHIR", where the transformation from screen dot definition to screen dot rendition space is a conformal mapping. FIG. 27b shows a grayscale wedge input image halftoned with a large screen element made of subscreen elements, each subscreen element containing a set of Kanji ideograms, where the transformation from screen dot definition to screen dot rendition space is a fish-eye mapping.

On the Fly Halftoning With Simultaneous Image Rendition

Figure 23A:
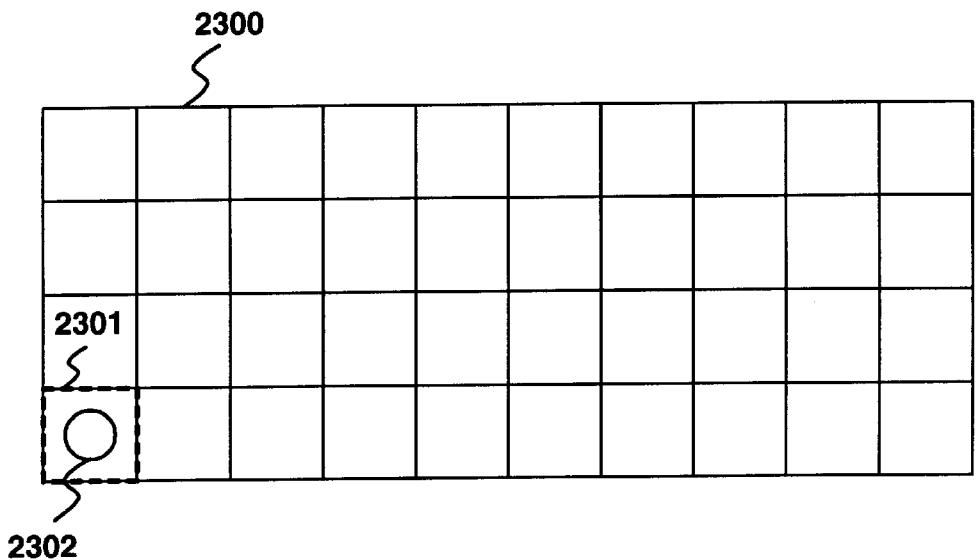
FIG. 23 shows the various areas used for describing the "on the fly halftoning" technique.
Figure 23B:
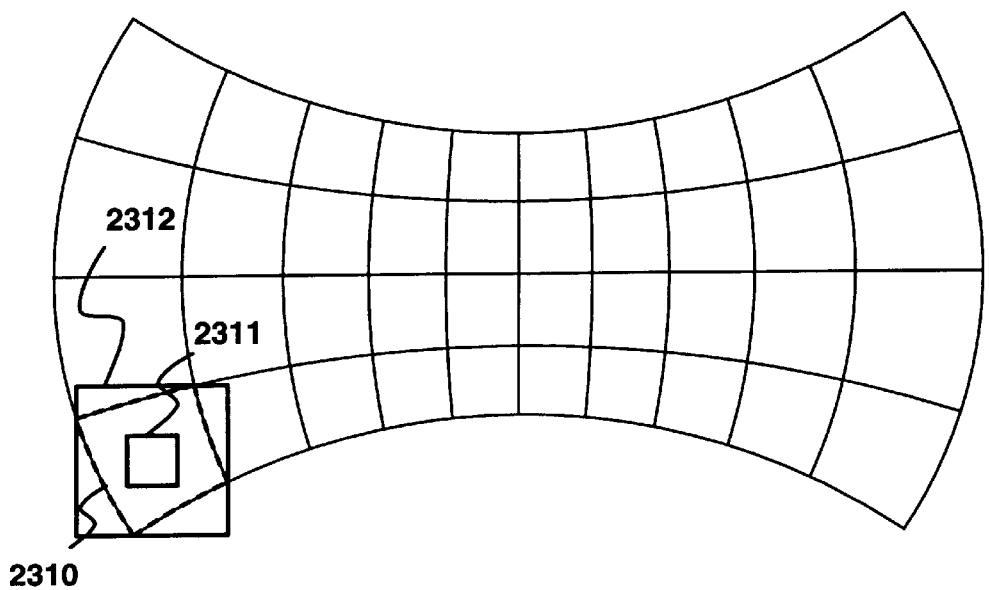

If the image to be rendered is large and if available memory space does not suffice to generate discrete screen elements at all desired gray levels, it is possible to generate the parts of discrete screen elements required for generating the image while the image is being generated (on the fly halftoning). FIG. 23a and FIG. 23b illustrate the various elements which are useful for on the fly halftoning. At the beginning, the screen element (2300) defined in the screen dot definition space is divided into subscreen elements. The edges of the subscreen elements (2301) are transformed from the screen dot definition space to the screen dot rendition space (2310). In the screen dot rendition space, an embracing rectangle (2312) is calculated for each subscreen element. This embracing rectangle is associated with a selection of predefined fixed contours (2302) which make up the corresponding screen element in the screen dot definition space. When scanning the variable intensity input image scanline by scanline and pixel by pixel it is necessary to find for each of the pixels $P_{ij}$ having intensity $g_{ij}$ their corresponding region $r_d$ in the output halftone image and their corresponding region $r_h$ (2311) in the screen dot rendition space. The set of embracing rectangles R which cover the region $r_h$ is detected. In order to render the current source image pixel $P_{ij}$ having intensity level $g_i$, first interpolating in the screen dot definition space between the contours which are found in the subscreen elements associated with the embracing rectangles belonging to set R produces the required interpolated subscreen dot contours. Then, transforming the interpolated contours from the screen dot definition space to the screen dot rendition space generates the transformed interpolated contours. In the screen dot rendition space, scan-conversion and filling of areas bounded by the so-obtained transformed interpolated contours is carried out, possibly taking into account the clipping window determined by the rectangular region $r_h$ (2311) in order to produce the desired discrete screen element portions associated with region $r_h$. Working with the discrete screen element portions obtained in this way, the part which is within the rectangular area $r_h$ is extracted and transferred towards the output halftone image region $r_d$. This method enables halftone images to be generated with as great a screen element period and size as desired and with a multitude of subscreen elements, respectively subscreen dots.

Let us also note that the dot gain compensation due to the reproduction process (gamma correction) can be carried out by interpolating between values stored for example in a multi-dimensional table, one dimension giving the desired gray level and the other dimensions giving the position of the current subscreen element dot within a screen element. The position of a subscreen element within a screen element defines its shape and area, therefore also defining its specific dot gain behavior. The resulting global dot gain compensation table gives the corrected input pixel intensity value which must be used to halftone the output image so as to compensate for dot gain.

A more local intensity range dependent dot gain compensation can be introduced by a multi-dimensional table that gives corrected scaling and interpolation coefficients $\kappa_h$ and $\kappa_i$ so as to compensate for dot gain within small intensity ranges during interpolation between fixed contours.

The image halftoning operation based on simultaneous generation of discrete screen element portions and image rendition can be speeded up by preparing in the screen dot rendition space a description of all the transformed fixed predefined contours. The contours will previously have been transformed from the screen dot definition space to the screen dot rendition space. The descriptions of all the transformed fixed predefined contours obtained in this manner are associated with their respective subscreen elements. Then, it is possible to generate a screen element at a given intensity level by interpolating in the screen dot rendition space between transformed fixed predefined contours. Using the contours obtained in this manner, scan-conversion and filling can be carried out taking into account the clipping window determined by the rectangular area $r_h$. As previously, it is necessary to extract from the so-obtained screen element portions the part which lies within rectangular region $r_h$ and transfer it towards region $r_d$ of the output halftone image.

Apparatus for Generating Halftone Images With Evolutionary Screen Dot Contours

Figure 8:
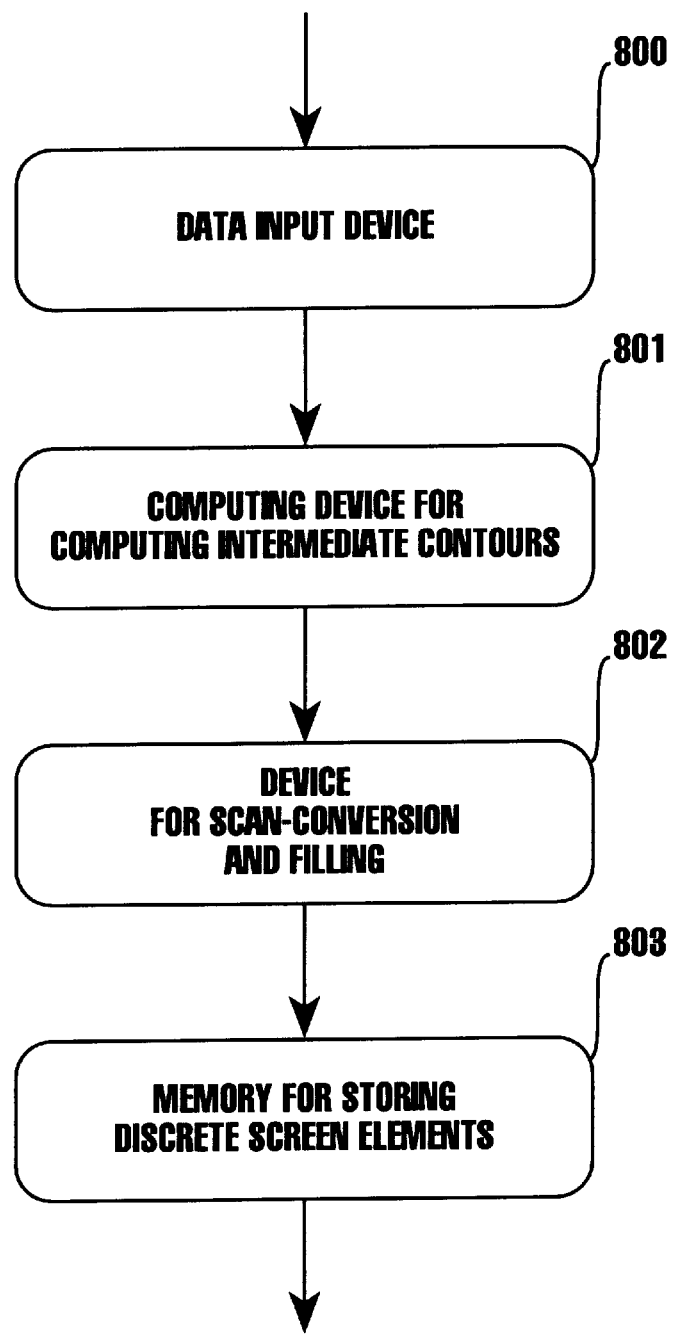
FIG. 8 gives an example of a device for generating screen elements by evolutionary screen dot contours.
Figure 9:
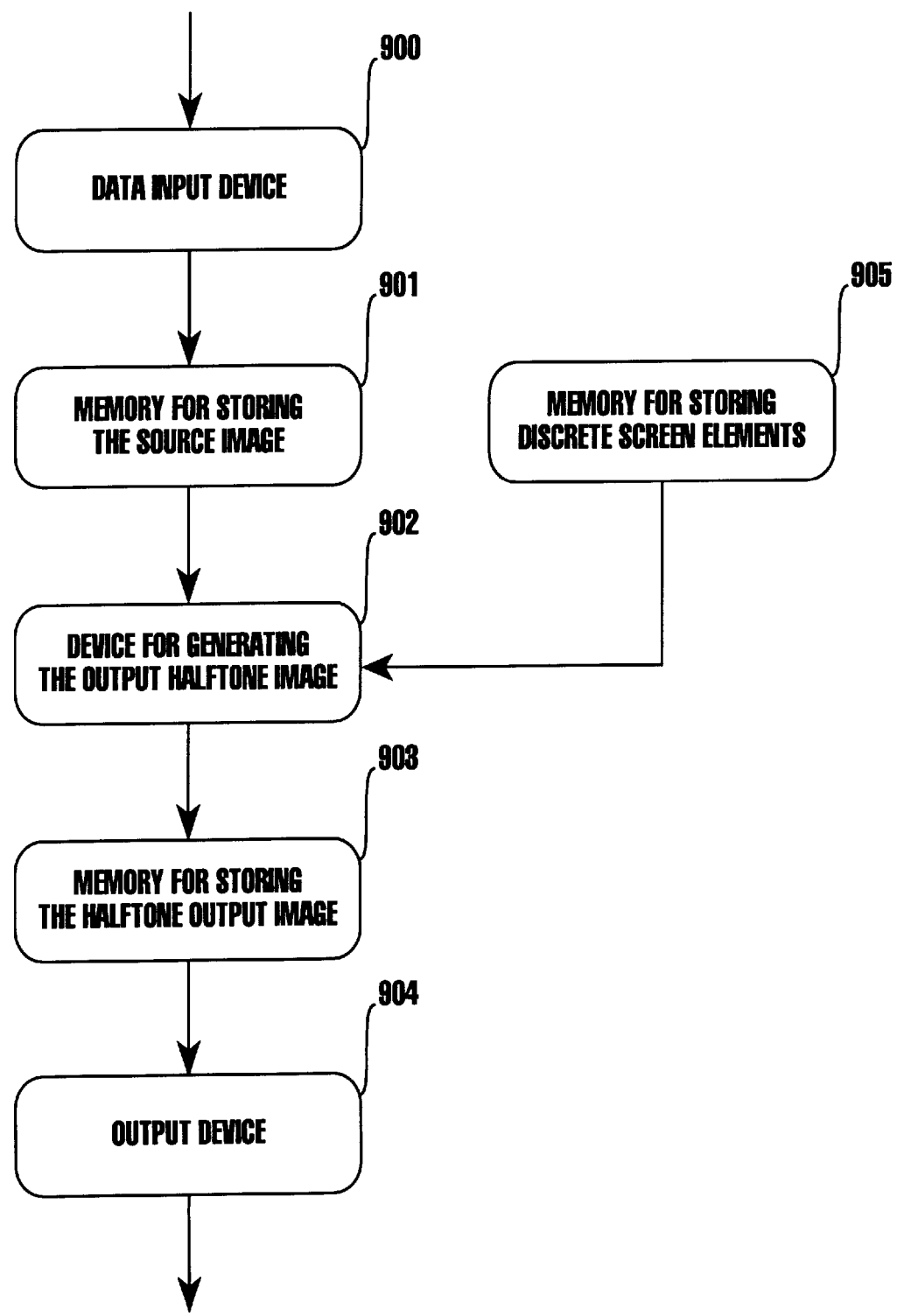
FIG. 9 gives an example of a device for generating halftone images using discrete screen elements generated by evolutionary screen dot contours.

An apparatus for generating halftone images with evolutionary screen dot contours comprises a device for generating discrete screen elements (e.g. the device shown in FIG. 8) and a device for the rendition of halftone images (e.g. the device shown in FIG. 9). Both these devices do not necessarily have to belong to the same physical installation. The discrete screen element generation device and the halftone image rendition device may be distant from one another; a means for transferring discrete screen elements from one device to another is adequate for generating halftone images with evolutionary screen dot contours, whose shapes are obtained by interpolating between fixed predefined contours.

The device for generating discrete screen elements, an example of which can be found in FIG. 8, includes a data input device (800) used to obtain the definition of the fixed predefined contours in the screen dot definition space, their associated intensity levels (gray levels), the table of the scaling and interpolation coefficients, as well as the dot gain compensation factors used to compensate for dot gain during the reproduction process, a computing device (801) used to obtain the intermediate contours associated with each of the reproducible gray levels and to transform the contours obtained in this manner from screen dot definition space to screen dot rendition space, a device for scan-conversion and filling (802) used to obtain discrete screen elements based on intermediate contours defined in the screen dot rendition space, and a memory (803) for storing the discrete screen elements obtained in this manner. Let us note that the devices used to compute the intermediate contours, to carry out scan-conversion and filling, as well as the memory used to store the discrete screen elements can be located in a computer to which the above-mentioned data reader is connected.

The device for the rendition of halftone images (example shown in FIG. 9) includes (a) a data input device (900) used to input the digitized source image as well as parameters which define, for example, the size of the output halftone image; (b) a device for storing the digitized source image (901), also called original image or input image, for example a computer memory; (c) a device for storing discrete screen elements (905), (d) a device for generating the output halftone image (902) whose function is to scan the input image, to define for each pixel of the input image the corresponding target region in the output image and to copy the part of the discrete screen element associated with the current input image pixel intensity level into the thus defined target region of the output image; (e) a memory used to store the rendered output halftone image (903), for example, a computer memory; (f) an output device (904) whose task is to transfer data from the output halftone image previously stored in memory towards a device for printing on paper, film or other matter (printer, phototypesetter, printing machine).

In the case of on the fly halftoning, the devices used to generate discrete screen elements and to render halftone images are to be found within the same computer and discrete screen element part generation is intermingled with output image rendition.

Advantages of the Invented Method

Figure 10:
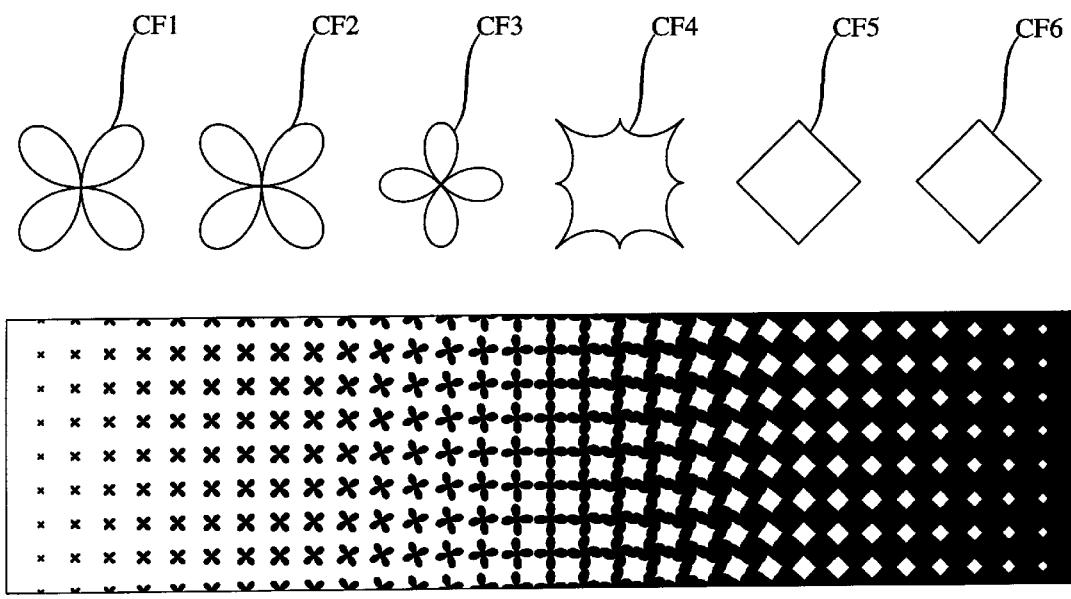
FIG. 10 gives an example of a sophisticated screen element whose screen dot shapes associated with different intensity levels are not embeddable within one another.

The method described above differs from methods previously known in the art by the fact that it does not use a dither matrix and that it can be used to generate shapes which are independent from one another at each gray level. Existing dither matrix halftoning techniques require that screen elements of successive gray levels must be embeddable within one another. This imbrication or embedding constraint does not exist in the invented method. Therefore, the invented method makes it possible to generate screen elements whose shapes evolve in a very subtle manner. As an example, FIG. 10 shows a screen shape which rotates when evolving from one gray level to another. Such effects are desirable for sophisticated graphics and for microlettering (see as examples FIG. 12, FIG. 25, FIG. 26b and FIG. 27b), and can be applied to create postage stamps, banknotes or valuable papers.

Figure 11:
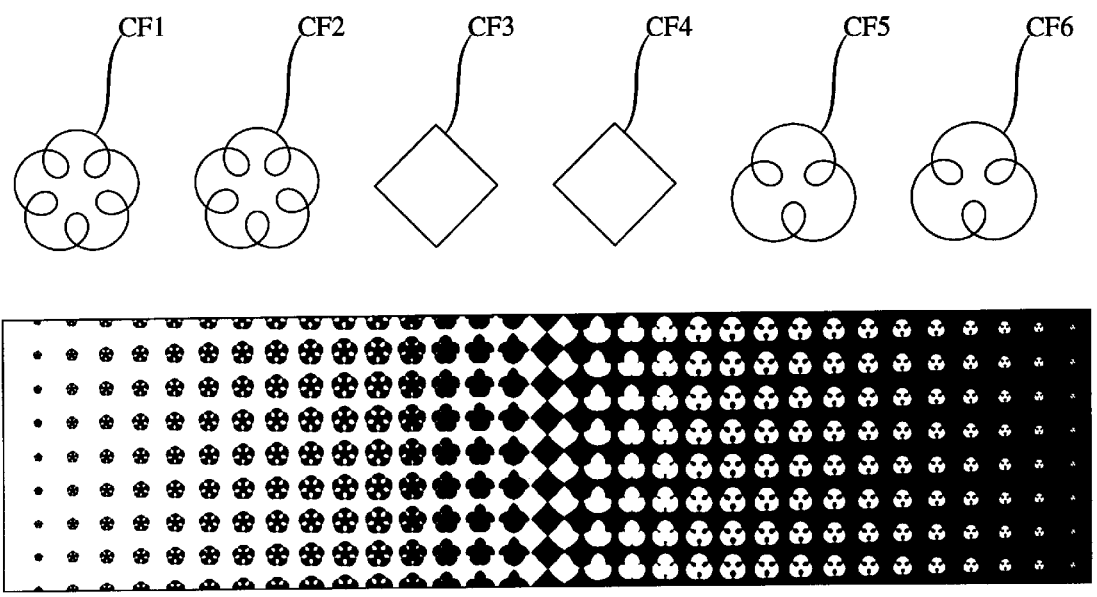
FIG. 11 gives an example of sophisticated screen dot shapes whose fixed predefined contours comprise self-intersections.
Figure 12:
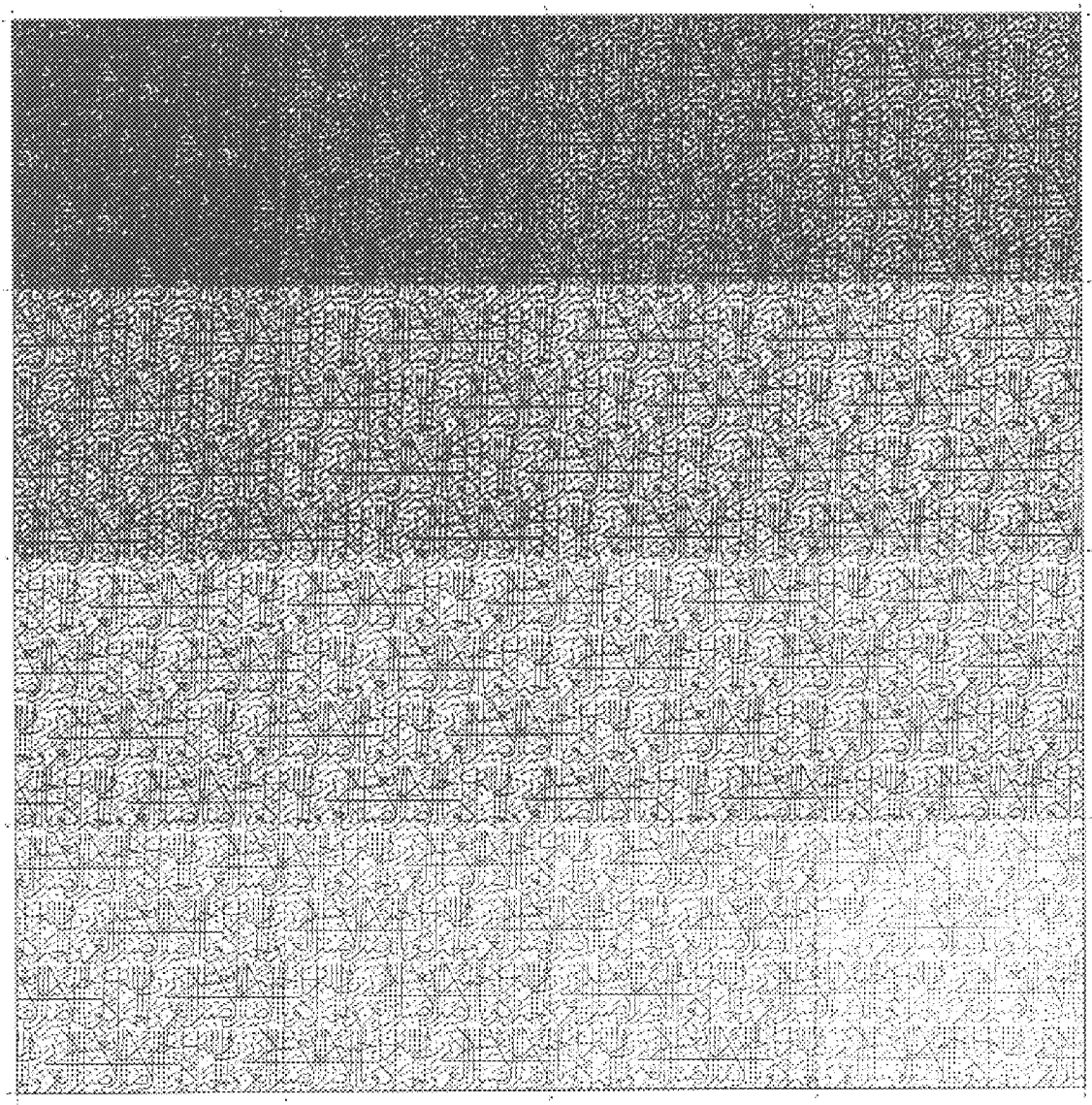
FIG. 12 illustrates the effect achieved by sophisticated screen dots shapes (arabic character shapes) making use of the freedom to freely place fixed predefined contours within the screen element.

Moreover, the invented method enables one to use as fixed predefined contours, self-intersecting contours, as is the case in the example of FIG. 11. Each fixed predefined contour is associated with a rule defining the interior and exterior parts of the contour. These rules, which are well-known in computer graphics, are either the parity rule or the winding-number rule. Moreover, since the successive fixed predefined contours do not have to be imbricated or embeddable, once they have been superposed, they may intersect one another. This freedom when generating fixed predefined contours enables the generation of extremely sophisticated screen dot shapes, such as the typographic letter shapes shown in FIG. 12. Thus, artistic screen elements of excellent quality can be generated.

The invented method is also unique inasmuch as it offers the possibility to define a function t for transforming from the screen dot definition space towards the screen dot rendition space. Thus, by dividing the screen element into adjoining subscreen elements, or, by defining a screen dot description made of a plurality of subscreen dots it is possible to generate in the screen dot rendition space subscreen dots whose period and area geometry vary according to their position. Choosing a transformation which includes for example a frequency modulation or a conformal mapping means that the generated subscreen elements, respectively subscreen dots have periods and areas which vary according to their position within the image. Counterfeiting such halftoned images is difficult because of the interference phenomena which occur when they are digitized using a scanner and because of the intensity flutter due to the position dependent dot gain variations generated by an optical reproduction process such as photocopying.

The invented method is the first to propose a technique for generating on the fly screen elements whose parts are generated one by one for each pixel or group of pixels of the source image. On the fly halftoning offers the possibility of generating extremely large sized discrete screen elements while keeping down the required memory size since the discrete screen element portions are generated as they are needed and therefore do not need to be memorized during the whole halftone image rendition process.

The invented method may also find applications in the field of publicity and advertising, especially for the design and creation of posters and advertising material. The use of latin, greek, cyrillic or arabic typographic characters, as well as the use of Chinese, Japanese or Korean ideograms as screen dot shapes offers new design freedom for creating posters and graphic designs.

REFERENCES

| | |
|---|---|
| [Bayer73] | B. E. Bayer, "An Optimum Method for Two-Level Rendition of Continuous-Tone Pictures", Conference Record of the International Conference on Communications, 1973, 26–11 to 26–15. |
| [Farin88] | G. Farin, Curves and Surfaces for Computer Aided Geometric Design, Academic Press, 1988 |
| [Fink92] | Fink, Peter, PostScript Screening: Adobe Accurate Screens, Mountain View, Ca., Adobe Press, 1992. |
| [Hersch91] | R. D. Hersch, "Fill and Clip of Arbitrary Shape" New Trends in Animation and Visualization (Eds. D. Thalmann, N. Magnenat-Thalmann), John Wiley, 1991, 3–12 |

What is claimed is:

1. A method of producing halftone images characterized by contour-based evolutionary screen-dot descriptions defining screen elements made of screen dots having arbitrary shapes, where discrete screen elements associated with a set of intensity levels are formed by an interpolation and transformation operation producing interpolated screen dot contours, said interpolation and transformation operation comprising an interpolation between fixed predefined contours and a mapping from a screen dot definition to a screen dot rendition space, and by rasterization of the so-obtained screen dot contours into discrete screen elements, the method comprising the steps of:
   a) defining at least two fixed predefined contours associated with given intensity levels in a screen dot definition space, said fixed predefined contours determining an evolution of screen dots at all other intensity levels,
   b) applying an interpolation and transformation operation to the fixed predefined contours so as to obtain interpolated screen dot contours in the screen dot rendition space,
   c) scan-converting and filling said interpolated screen dot contours to produce discrete screen elements associated with each of said intensity levels,
   d) generating an output halftone image by applying an output image rendition operation requiring determining for all output image pixels corresponding input image intensity levels and copying corresponding pixels from the discrete screen elements associated with said input image intensity levels to said output image pixels.

2. The method of claim 1, where the screen elements are made of a plurality of subscreen dots and where the interpolation and transformation operation induced mapping between screen dot definition space and screen dot rendition space creates subscreen dots of varying periods and areas, thereby generating when optically reproduced, for example by photocopy, position-dependent dot gain inducing visible intensity variations and when digitally reproduced, for example by a scanner, visible moiré patterns, thus making faithful counterfeiting difficult.

3. The method of claim 2, where the interpolation and transformation operation induced mapping between screen dot definition space and screen dot rendition space comprises a sinusoidal mapping function.

4. The method of claim 2, where the interpolation and transformation operation induced mapping between screen dot definition space and screen dot rendition space comprises a conformal mapping function.

5. The method of claim 2, where the interpolation and transformation operation induced mapping between screen dot definition space and screen dot rendition space comprises a fish-eye mapping function.

6. The method of claim 2, where dot gain compensation factors for compensating for the dot gain of subscreen dots are computed as a function of the intensity level and of the position of the subscreen dot within the screen element and where said dot gain compensation factors are stored in a table which is used for dot gain compensation during halftone image rendition.

7. The method of claim 1, where the screen elements can be made as large as desired by dividing them into a plurality of adjoining subscreen elements, thereby allowing production of an angled screen layer approximating a desired orientation to any desired precision, thereby providing a method for exact-angle screening which can be used for producing exact angle screen layers in colour reproduction.

8. The method of claim 1, where determining for all output image pixels corresponding input image intensity levels comprises the step of scanning the input image scanline by scanline and pixel by pixel, computing for each pixel of the input image their corresponding regions in the discrete screen element and in the output halftone image and copying for each input image pixel said region of the discrete screen element associated with the intensity level of the current input image pixel onto said region of the output halftone image.

9. The method of claim 1, where fixed predefined contours are represented by straight line segments and polynomial spline segments.

10. The method of claim 1, where the interpolation and transformation operation applied to the fixed predefined contours comprises first interpolations between fixed predefined contours in the screen dot definition space so as to obtain interpolated screen dot contours in the screen dot definition space and then a mapping of said interpolated screen dot contours from screen dot definition space to screen dot rendition space.

11. The method of claim 1, where the interpolation and transformation operation applied to the fixed predefined contours comprises first a mapping of the fixed predefined contours from screen dot definition space to screen dot rendition space, and then interpolations between mapped fixed predefined contours so as to obtain interpolated screen dot contours in the screen dot rendition space.

12. A method of claim 1, where an interpolated screen dot contour is obtained by interpolation between two fixed predefined contours, the interpolation using a scaling coefficient $\kappa_h$ and an interpolation coefficient $\kappa_i$ precomputed for each intensity level, the coordinates of a control point Z of the interpolated screen dot contour being obtained by:

$$\vec{Z}-\vec{Z}_0=\kappa_h((1-\kappa_i)(\vec{Z}_L-\vec{Z}_0)+\kappa_i(\vec{Z}_R-\vec{Z}_0))$$

where
$Z_0$ are the coordinates of a reference point, $\kappa_h$ and $\kappa_i$ are respectively the scaling and interpolation coefficients and $Z_L$ and $Z_R$ are the coordinates of the corresponding control points of said fixed predefined contours.

13. The method of claim 1, where the screen elements are made of a plurality of subscreen dots and where subscreen dot shapes are made of typographic letter shapes, thereby allowing generation of images composed of subscreen dot letter shapes which are of interest for avoiding counterfeiting and for creating posters having artistic characteristics.

14. The method of claim 1, where the screen elements are made of a plurality of subscreen dots and where subscreen dot shapes are made of ideograms, thereby allowing generation of images composed of subscreen dot shapes made of ideograms, which are of interest for avoiding counterfeiting and for creating posters of high artistic quality.

15. A method of producing halftone images characterized by contour-based evolutionary screen-dot descriptions defining screen elements made of screen dots having arbitrary shapes, where discrete screen elements are generated on the fly at output halftone image rendition time, the method comprising the steps of a) scanning an input grayscale image scanline by scanline and pixel by pixel and finding for each of pixels $P_{ij}$ having intensity $g_{ij}$ their corresponding regions $r_d$ in an ouput halftone image and $r_h$ in a screen dot rendition space;

b) selecting those fixed predefined contours, which after transformation from screen dot definition space to screen dot rendition space cover a region $r_h$ in the screen dot rendition space;

c) applying an interpolation and transformation operation to the selected fixed predefined contours so as to obtain interpolated screen dot contours in the screen dot rendition space associated with intensity levels $g_{ij}$, d) scan converting and filling said interpolated screen dot contours to produce discrete screen element parts covering regions $r_h$ for intensity levels $g_{ij}$, e) extracting discrete screen element parts covering regions $r_h$ and copying them in the corresponding output halftone image regions $r_d$.

16. The method of claim 15, where the screen elements are composed of a plurality of subscreen dots, where the mapping between screen dot definition space and screen dot rendition space applied to the subscreen dots generates in the screen dot rendition space subscreen dots whose dot shapes vary according to their position within the screen element and where in addition to steps (a) to (e) a dot gain compensation step taking into account the current intensity level $g_{ij}$ and the position of the subscreen element within the screen element is applied in order to compensate for the dot gain, whereby optical reproduction for example by photocopy, will show intensity variations due to position-dependent dot gain and digital reproduction, for example by a scanner, will show visible moiré patterns, due to interferences between subscreen dot frequencies and the scanning frequency.

17. The method of claim 15, where step c) is made more efficient by transforming once all fixed predefined contours from screen dot definition space to screen dot rendition space, by storing the transformed fixed predefined contours and by interpolating between said stored transformed fixed predefined dot contours so as to obtain interpolated screen dot contours.

18. An apparatus for producing halftone images whose screen elements are defined by contour-based evolutionary screen dot descriptions, the apparatus being characterized by a discrete screen element generating device comprising:

(a) a data input device for inputting fixed predefined contours as well as their associated intensity levels in a screen dot definition space, (b) a computing device operable for computing intermediate contours from fixed predefined contours and operable for transforming contours from the screen dot definition space into a screen dot rendition space, (c) a scan-conversion and filling device producing discrete screen elements from intermediate contours defined in the screen dot rendition space, and (d) a memory for storing said discrete screen elements and by a halftone image rendition device comprising:

(a) a data input device for inputting an input image, (b) a storage device for storing the input image, (c) a device operable for generating a halftone output image, which scans the input image scanline by scanline and pixel by pixel, computes for each pixel of the input image corresponding target regions in the discrete screen element and in the halftone output image and copies the target region of the discrete screen element associated with the intensity level of the current input image pixel onto the target region of the output image, (d) a memory device for storing the output halftone image, and (e) an output device for transferring the output halftone image to a printing device used to reproduce the image.

19. An apparatus according to claim 18, where the data input device is operable for inputting scaling $\kappa_h$ and interpolation $\kappa_i$ coefficients used for interpolating between fixed predefined contours and for inputting dot gain compensation factors required to compensate for screen dot gain during halftone image rendition.

20. An apparatus according to claim 18 where the discrete screen element generating device and the halftone image rendition device are part of the same device and where the computing device, the scan-conversion and filling device, the halftone image rendition device and the storage memories are all part of the same computer.

21. A method of producing halftone images characterized by contour-based evolutionary screen-dot descriptions defining screen elements made of screen dots having arbitrary shapes, where discrete screen elements associated with a set of intensity levels are formed by an interpolation and transformation operation producing interpolated screen dot contours, said interpolation and transformation operation comprising an interpolation between fixed predefined contours and a mapping from a screen dot definition to a screen dot rendition space, and by rasterization of the so-obtained screen dot contours into discrete screen elements, the method comprising the steps of:

a) defining at least two fixed predefined contours associated with given intensity levels in a screen dot definition space, said fixed predefined contours determining an evolution of screen dots at all other intensity levels, b) applying an interpolation and transformation operation to the fixed predefined contours so as to obtain interpolated screen dot contours in the screen dot rendition space, c) scan-converting and filling said interpolated screen dot contours to produce discrete screen elements associated with each of said intensity levels, d) generating an output halftone image by applying an output image rendition operation requiring determining for all output image pixels corresponding input image intensity levels and copying corresponding pixels from the discrete screen elements associated with said input image intensity levels to said output image pixels; where an interpolated screen dot contour is obtained by interpolation between two fixed predefined contours, the interpolation using a scaling coefficient $\kappa_h$ and an interpolation coefficient $\kappa_i$ precomputed for each intensity level, the coordinates of a control point Z of the interpolated screen dot contour being obtained by $$\vec{Z} - \vec{Z}_0 = \kappa_h((1-\kappa_i)(\vec{Z}_L - \vec{Z}_0) + \kappa_i(\vec{Z}_R - \vec{Z}_0))$$

where $Z_0$ are the coordinates of a reference point, $\kappa_h$ and $\kappa_i$ are respectively the scaling and interpolation coefficients and $Z_L$ and $Z_R$ are the coordinates of the corresponding control points of said fixed predefined contours.

* * * * *